(12) United States Patent
Erdenberger

(10) Patent No.: US 10,792,618 B2
(45) Date of Patent: Oct. 6, 2020

(54) PARTICLE SEPARATION AND/OR PURIFICATION OF A FLUID

(71) Applicant: Sartorius Stedim Biotech GmbH, Goettingen (DE)

(72) Inventor: Thomas Erdenberger, Arlington, MA (US)

(73) Assignee: Sartorius Stedim Biotech GmbH (DE)

( * ) Notice: Subject to any disclaimer, the term of this patent is extended or adjusted under 35 U.S.C. 154(b) by 1 day.

(21) Appl. No.: 16/011,683

(22) Filed: Jun. 19, 2018

(65) Prior Publication Data

US 2019/0381457 A1   Dec. 19, 2019

(51) Int. Cl.

| B01D 61/14 | (2006.01) |
|---|---|
| B01D 53/04 | (2006.01) |
| B01D 61/18 | (2006.01) |
| B01D 61/24 | (2006.01) |
| B01D 61/32 | (2006.01) |
| B01D 61/58 | (2006.01) |

(52) U.S. Cl.
CPC ....... *B01D 61/142* (2013.01); *B01D 53/0407* (2013.01); *B01D 53/0454* (2013.01); *B01D 61/18* (2013.01); *B01D 61/246* (2013.01); *B01D 61/32* (2013.01); *B01D 61/58* (2013.01); *B01D 2201/32* (2013.01); *B01D 2257/91* (2013.01); *B01D 2259/804* (2013.01); *B01D 2315/10* (2013.01); *B01D 2325/12* (2013.01)

(58) Field of Classification Search
CPC .............. B01D 61/142; B01D 53/0407; B01D 53/0454; B01D 61/18; B01D 61/246; B01D 61/32; B01D 61/58; B01D 63/082
See application file for complete search history.

(56) References Cited

U.S. PATENT DOCUMENTS

| 5,575,910 | A | 11/1996 | Karbachsch et al. |
|---|---|---|---|
| 5,951,875 | A | 9/1999 | Kanel et al. |
| 6,089,242 | A * | 7/2000 | Buck ....................... A01J 7/022 119/14.18 |
| 6,596,172 | B1 | 7/2003 | Kopf |
| 7,465,397 | B2 | 12/2008 | Siwak et al. |

(Continued)

FOREIGN PATENT DOCUMENTS

| DE | 102012002540 A1 | 8/2013 |
|---|---|---|
| EP | 3015542 A1 | 5/2016 |

(Continued)

*Primary Examiner* — Chester T Barry
(74) *Attorney, Agent, or Firm* — Gerald E. Hespos; Michael J. Porco; Matthew T. Hespos

(57) ABSTRACT

A platform has a filter system with a first set of filter modules and a second set of filter modules that is different from the first set of filter modules. Each set of filter modules includes an inflow channel and an outflow channel. A fluid inlet is connected to the first set of filter modules, a fluid outlet is connected to the second set of filter modules, and a separation interface separates the first and second sets of filter modules. The separation interface has a first interface channel to connect to the module outflow channel of the first set of filter modules, and a second interface channel to connect to the module inflow channel of the second set of filter modules. The filter system receives fluid through the fluid inlet and, after the fluid has passed through each set of filter modules, discharges the fluid through the fluid outlet.

18 Claims, 11 Drawing Sheets

(56) References Cited

U.S. PATENT DOCUMENTS

| | | |
|---|---|---|
| 8,584,349 B2 | 11/2013 | Scannon et al. |
| 9,650,412 B2 | 5/2017 | Konstantinov et al. |
| 9,650,413 B2 | 5/2017 | Konstantinov et al. |
| 9,657,056 B2 | 5/2017 | Konstantinov et al. |
| 9,669,333 B2 | 6/2017 | Leuthold et al. |
| 9,770,804 B2 * | 9/2017 | Byers .................. B24B 57/02 |
| 9,982,226 B2 | 5/2018 | Tijsterman |
| 2005/0053707 A1 * | 3/2005 | Kopf .................. A23C 9/1422 |
| | | 426/491 |
| 2009/0008318 A1 * | 1/2009 | Anes .................. B01D 61/18 |
| | | 210/262 |
| 2011/0258837 A1 | 10/2011 | Scannon et al. |
| 2011/0301342 A1 | 12/2011 | Wang et al. |
| 2012/0264920 A1 | 10/2012 | Wang et al. |
| 2013/0012689 A1 | 1/2013 | Singh |
| 2013/0067721 A1 | 3/2013 | Scannon et al. |
| 2013/0260419 A1 | 10/2013 | Ransohoff et al. |
| 2014/0154270 A1 | 6/2014 | Wang et al. |
| 2014/0255994 A1 | 9/2014 | Konstantinov et al. |
| 2014/0322349 A1 * | 10/2014 | Martin .................. A61K 33/40 |
| | | 424/616 |
| 2014/0348845 A1 | 11/2014 | Bill, Jr. et al. |
| 2015/0001147 A1 | 1/2015 | Leuthold et al. |
| 2015/0065696 A1 | 3/2015 | Wang et al. |
| 2015/0133636 A1 | 5/2015 | Xenopoulos et al. |
| 2015/0183821 A1 | 7/2015 | Konstantinov et al. |
| 2015/0232505 A1 | 8/2015 | Konstantinov et al. |
| 2015/0299644 A1 | 10/2015 | Tijsterman |
| 2017/0058508 A1 | 3/2017 | Scannon et al. |
| 2017/0153210 A1 | 6/2017 | Eriksson |
| 2017/0173537 A1 | 6/2017 | Gagnon |
| 2017/0218012 A1 | 8/2017 | Konstantinov et al. |
| 2017/0320909 A1 | 11/2017 | Xenopoulos et al. |
| 2018/0135006 A1 | 5/2018 | Maiser et al. |

FOREIGN PATENT DOCUMENTS

| | | |
|---|---|---|
| WO | 2010075389 A2 | 7/2010 |
| WO | 2011146179 A2 | 11/2011 |
| WO | 2012051147 A1 | 4/2012 |
| WO | 2012078677 A2 | 6/2012 |
| WO | 2013009491 A2 | 1/2013 |
| WO | 2013096322 A1 | 6/2013 |
| WO | 2014004281 A1 | 1/2014 |
| WO | 2014073967 A1 | 5/2014 |
| WO | 2014137903 A2 | 9/2014 |
| WO | 2015121425 A1 | 8/2015 |
| WO | 2015133972 A1 | 9/2015 |

\* cited by examiner

PARTICLE SEPARATION AND/OR PURIFICATION OF A FLUID

BACKGROUND

Field of the Invention

The present application relates to separation of constituents of interest from a fluid (e.g., particle separation) and/or purification of the fluid. In particular, the present application relates to a platform for performing particle separation of the fluid and/or purification of the fluid and a method for configuring the platform.

Related Art

Unless otherwise indicated herein, the approaches described in this section are not prior art to the claims in this application and are not admitted to be prior art by inclusion in this section.

Purification and/or particle separation may be performed in order to produce a chemical, pharmaceutical, and/or biological product from a fluid. The fluid (i.e., liquid or gas) may include biomolecules. The product may be a biotechnological product. Production of the product may include depth filtration, body feed filtration, chromatography (e.g. membrane chromatography), tangential flow filtration (TFF), antibody polishing, sterilization filtration, buffering, bioburden removal, other types of protein purification or biologically active particle separation.

Accordingly, the fluid may be produced in a bioreactor, e.g., by way of microorganisms and/or cell cultures. In order to produce the product, it may be necessary to separate or extract substances, such as the microorganisms themselves, the nutrients and other contaminants from the fluid. Depending on the type and quality of the product which is to be obtained in the production process and depending on the production process, different filters with different filter properties may be used. In particular, the filter properties may include structure, material, layers, pore size, filtration grade, nominal molecular weight cutoff.

According to conventional approaches, a process of purifying a fluid and/or separating particles (i.e., solids) from the fluid includes a number of steps, each of which is carried out in a separate equipment system. For example, a resin chromatography processing step is normally contained in one containment column housing the resins, with a separate set of process piping and process control hardware and software (skids). The same is true for cell harvesting depth filtration from the bioreactor. In particular, the resin chromatography processing step and the step of cell harvesting depth filtration are each contained in separate equipment, possibly in different rooms. Further, each step of the process may require its own control system.

The cost of the process typically includes separate equipment and space costs for control and processing hardware associated with each process step. Accordingly, there may be considerable overlap and redundancy between different process steps. For example, the control system hardware for the resin chromatography processing step may be similar to the control system hardware for the cell harvesting depth filtration step; only a few components and control software functions might differ.

Hence, it may be desirable to provide purification of the fluid and/or separation of constituents (e.g., particles or substances) from the fluid in a compact format, such that redundancies and extra costs are minimized. In addition, it may be desirable to connect auxiliary elements or components to the filter system. For example, by connecting auxiliary elements it may be possible to maximize recovery of the product. In other words, it may be possible to maximize the amount of the product that can be produced per unit of fluid. In particular, it may be possible to extract usable product from retentate retained by a filter media, to purify constituents of interest retained by filter media or to wash (i.e., clean) filter media for further use in separating undesirable constituents (e.g., contaminants) from the fluid.

SUMMARY

According to an aspect, a platform is provided. The platform may be for separating constituents of interest (e.g., performing particle separation) from a fluid and/or purifying the fluid (i.e. fluid to be filtered). The platform comprises at least one filter system. The filter system comprises a first set of one or more filter modules and a second set of one or more filter modules. The first set of filter modules differs from the second set of filter modules. For example, the first set of filter modules may include depth filters having a relatively coarse filtration grade. In particular, particles having a size of between about 1.5 μm and about 20 μm may be retained.

The second set of filter modules may include filters having a finer filtration grade than filters in the first set of filter modules. In particular, filters in the second set of filter modules may be capable of filtering particles having a size (e.g., diameter) of about 0.1 μm up to a size of about 1 μm. Deriving or separating constituents (e.g., constituents of interest) from the fluid may include particle separation. Particle separation may relate to removing particles (i.e., solids) from the fluid or separating particles of different sizes or properties.

Each set of filter modules includes a module inflow channel and a module outflow channel. In particular, fluid may flow into the respective set of filter modules via the module inflow channel and out of the respective set of filter modules via the module outflow channel. Each channel may be implemented as a tube or pipe.

The first and second sets of filter modules may be part of a single filter system. Alternatively, the first set of filter modules may be in a first filter system of the platform and the second set of filter modules may be in a second filter system of the platform. In such a case, the platform would include two filter systems.

The filter system further comprises a fluid inlet to be fluidly connected to the first set of filter modules and a fluid outlet to be fluidly connected to the second set of filter modules. In some cases, the filter system is received as a set of components. Before operating the filter system, the components may be connected to each other. For example, the fluid inlet may be fluidly connected to the first set of filter modules when configuring the filter system before operation of the filter system, i.e. when each of the filter modules in the first set is in an arrangement position (discussed in more detail below). Similarly, the fluid outlet may be fluidly connected to the second set of filter modules when configuring the filter system before operation, i.e. when each of the filter modules in the second set is in the arrangement position.

The at least one filter system is operable or configurable to receive the fluid through the fluid inlet and, after the fluid has passed through each of the filter modules, discharge the fluid through the fluid outlet. In addition to passing through each set of filter modules, the fluid may also pass through at least one external auxiliary element before being discharged through the fluid outlet.

The filter system further comprises a separation interface separating the first set of filter modules from the second set of filter modules. The separation interface comprises a first interface channel to be fluidly connected to the module outflow channel of the first set of filter modules, and a second interface channel to be fluidly connected to the module inflow channel of the second set of filter modules. The separation interface may also be provided as a component of the filter system to be assembled before operation of the filter system. In particular, the first interface channel may be fluidly connected to the module outflow channel of the first set of filter modules before operating the filter system, i.e. when each of the filter modules in the first set is in the arrangement position. Similarly, the second interface channel may be fluidly connected to the module inflow channel of the second set of filter modules before operating the filter system, i.e. when each of the filter modules in the second set is in the arrangement position.

The platform may further comprise at least one external auxiliary element. The external auxiliary element may be configurable or operable to receive fluid from the first set of filter modules via the filter interface channel, process the fluid, and discharge processed fluid to the second set of filter modules via the second interface channel.

In some cases, the first interface channel comprises at least one valve. Further, the second interface channel may comprise at least one valve. For example, one or more valves on the first interface channel may control whether filtrate from the first set of filter modules flows to the second set of filter modules, or fluid including constituents of interest derived via the first set of filter modules flows to the external auxiliary element for further processing before flowing to the module inflow channel of the second set of filter modules.

The first interface channel of the separation interface may be an interface inflow channel fluidly connected to the module outflow channel of the first set of filter modules. The second interface channel of the separation interface may be an interface outflow channel fluidly connected to the inflow channel of the second set of filter modules.

In some cases, the external auxiliary element includes at least one tank (i.e., vessel). For example, a first tank may be used to condition the fluid prior to filtration or after filtration.

More specifically, the first tank may be for processing fluid containing constituents (e.g., particles) of interest derived via one of the sets of filter modules. A second tank may be used for storing a biological buffer to adjust the pH of the fluid during processing of the fluid by the external auxiliary element. A waste tank may be used to store waste. For example, filtrate including undesired substances may flow into the waste tank while constituents of interest are retained by a set of membrane modules.

The fluid received by the external auxiliary element via the first interface channel may include constituents of interest from the first set of filter modules (e.g., as filtrate or retentate depending on the type of filters in the first set of filter modules). In particular, the fluid including constituents of interest may have been purified via the first set of filter modules.

The separation interface may include further interface channels. For example, a third interface channel of the separation interface may be fluidly connected to a module outflow channel of the second set of filter modules. In this case, the second set of filter modules may have multiple module outflow channels (e.g., one module outflow channel for recirculation and one module outflow channel for waste). Such an arrangement may be useful in the context of TFF, where fluid flows from the first set of filter modules to the second set of filter modules, flows through the second set of filter modules, and may then be recirculated through the external auxiliary element (e.g., for diafiltration) before again flowing through the second set of filter modules.

In some cases, at least one of the sets of filter modules connected to the external auxiliary element (e.g., the first set of filter modules) contains membrane adsorbers (i.e., as filter media). Fluid discharged from the first set of filter modules may flow to the external auxiliary element. The external auxiliary element may include piping or cells. The external auxiliary element may include one or more sensors for detecting pH, conductivity, UV light absorbance, or other changes in the environment related to adsorption and desorption. The piping or cells and the sensors may be used to effect absorption and desorption of constituents of interest from the membrane adsorbers.

Microfiltration membranes or ultrafiltration membranes may be used as membrane filter media. Membrane filter media may be used in dead-end filters, tangential flow filters or adsorbers. Adsorbers will be referred to as filters herein, even though particle separation results from the effects of surface change rather than physical size of the particles.

An adsorber (e.g., adsorption membrane) may be a microporous membrane filter medium which carries one or more functional groups (of atoms or bonds within molecules) on its inner and/or outer surface. The functional groups may interact physically and/or chemically with substances that are contained in the received fluid. Chemical interaction may be any covalent, ionogenic bond interaction and/or any bond interaction that is based on electrostatic or hydrophobic (for example, van der Waals interaction) interactions between substances in the fluid and the functional groups of the adsorber. The adsorber may have an affinity for a molecule (for example an antibody or a virus). The adsorber may have functional groups that are selected from the following: ion exchangers, salt tolerant ligands, chelating agents, thiophilic or hydrophobic ligands of different chain length and configurations, reversed phase ligands, reactive dyes, affinity ligands, and proteins (particularly enzymes).

Accordingly, it may be possible for the external auxiliary element to further process fluid that has already been processed by one set of modules in the filter system and thereby increase the amount of the product that is ultimately produced. In other words, further processing of the fluid may maximize the amount of product that can be produced per volume of fluid that is fed into the filter system. The further processing may include purification of the fluid and/or a different type of filtering (adsorption versus depth filtration). Maximizing the amount of product produced per volume of received fluid may in turn reduce the cost of producing the product.

In this way, it is possible that discharge from the first set of filter modules or the second set of filter modules may be passed to a further set of filter modules (e.g., TFF filter modules). Thus, the first set of filter modules is configured to perform one type of filtering while the further set of filter modules is configured to perform a different type of filtering. Constituents of interest (e.g., particles of a chemical, pharmaceutical or biological product) may be retained by the further set of filter modules. In particular, the further set of filter modules may be of a specified porosity such that constituents of interest are retained while smaller, undesirable fluid constituents pass through the filters as filtrate and are discharged as waste.

The external auxiliary element may process the fluid by purifying (e.g., washing, diafiltration) and/or removing (e.g., eluting from adsorbers) the fluid. The purifying and/or removal may be part of a chromatography process. In particular, constituents of interest in the retentate of the further set of filter modules may be purified by recirculating the fluid over the further set of filter modules (e.g., by means of an auxiliary pump), in order to concentrate the constituents of interest. The fluid including the concentrated constituents of interest may then be combined with a solution for further purification, for example, the fluid may be washed using a buffered saline. The constituents of interest are thus concentrated and purified and the filtrate may be discharged (e.g., for processing or as waste). After a suitable concentration and purification the processed fluid including the constituents of interest may be passed to yet another set of filter modules. Concentration and/or purification of the fluid via the external auxiliary element may increase the amount of product that can be derived from a starting fluid (i.e., feed) in comparison to conventional approaches.

In some cases, the further set of filter modules is configured for tangential flow filtration (i.e., cross-flow filtration). In tangential flow filtration, the fluid passes through a membrane or bed, particles being trapped in a filter medium and the filtrate being released at the other end. The majority of incoming fluid (or feed) flows tangentially across the surface of the filter medium rather than into the filter medium. Tangential flow filtration may be performed using surface filter media.

The first set of filter modules and/or the second set of filter modules may include filter media for dead-end (i.e., through-flow) filtration or tangential flow filtration. Further each of the sets of filter modules may include depth filters or surface filters.

In dead-end filtration, most or all of the fluid passes through the filter medium, producing a filtrate (which is typically particle-free), while separated constituents form a filter cake. Dead-end filtration may be performed using depth filter media or adsorption filter media.

The filter system may comprise a plurality of fluid inlets. The fluid received through one of the fluid inlets may be received from a bioreactor. A sanitizer may also be received through the fluid inlet. Alternatively, the sanitizer may be received through a fluid inlet that is different from the fluid inlet used to receive the fluid from the bioreactor. The sanitizer may be an aqueous, alkaline or acidic based solution that reduces bioburden in the filter system. The filter system may discharge sanitizer waste. The sanitizer waste may be discharged via the separation interface (e.g., the second interface channel) and/or the fluid outlet. Alternatively, the sanitizer waste may be discharged via a third interface channel fluidly connected to the module outflow channel of the first set of filter modules and/or the module outflow channel of the second set of filter modules.

The external auxiliary element may process the fluid by separating out at least one substance (e.g., impurity or contaminant) from the received fluid. The separation may be performed via chromatography (e.g., ion exchange, hydrophobic interaction, immobilized metal ion affinity), diafiltration, tangential flow filtration, or dialysis. In some cases, the external auxiliary element may perform filtration complementary to the filtration performed by the filter system. For example, the filter system may perform filtration using depth filters and membranes; the external auxiliary element may perform filtration via membrane chromatography.

In addition, the external auxiliary element may be used to transfer fluid from one set of filter modules in the filter system to another. Further, the external auxiliary element may contain sensors, e.g., for membrane chromatography. The external auxiliary element may include devices for mixing retained constituents of interest with at least one purifying agent (e.g., a buffering solution containing a weak acid and its conjugate base), and a tank for pooling or collecting fluid constituents of interest (i.e., the product). The external auxiliary element may perform further conditioning such as virus inactivation (e.g., chemical or ultraviolet) or filtration for bioburden reduction (or sterilization).

The external auxiliary element may also include means for heating or cooling or be configured to combine (i.e., conjugate) the output of one set of filter modules with the output of another set of filter modules.

The external auxiliary element may process the fluid by adjusting the pH of the fluid. In particular, the external auxiliary element may adjust the pH of the fluid by adding a stabilizing buffer to the fluid. The stabilizing buffer may be a biological buffer. The buffer may comprise an acid and its conjugated base. The buffer may be a Good buffer (i.e., one of 20 buffering agents for biochemical and biological research selected and described by Norman Good and colleagues). The buffer may be zwitterionic.

The external auxiliary element may comprise a self-contained filter unit. The self-contained filter unit may include at least one capsule. The self-contained filter unit may be for sterilizing grade filtration. The self-contained filter unit may include a membrane.

The external auxiliary element may process the fluid by performing one or more of the following: bioburden reduction filtration, TFF, sterilizing the fluid.

The separation interface may fluidly separate the module inflow channel of the first set of filter modules from the module inflow channel of the second set of filter modules. This may be achieved as follows. The separation interface may close the module inflow channel of the first set of filter modules to the second set of filter modules, thereby preventing fluid that has not been filtered by the first set of filter modules from passing directly to the second set of filter modules. Further, the separation interface may close the module outflow channel of the second set of filter modules to the first set of filter modules, thereby preventing fluid filtered by the second set of filter modules from flowing back to the first set of filter modules.

The platform may comprise a control system for controlling processing of the fluid. Use of the same control system for the entire platform, including a filter system with modules, in comparison to the use of a separate control system for each process step, may lead to considerable efficiency improvements. In particular, the use of a single control system for the platform (in comparison to separate control systems for various chromatography columns) may save costs and may make it easier to control the process in order to produce the product and collect relevant process data. Further, multiple filter systems and/or multiple external auxiliary elements may be combined within the platform and controlled from the control system. This may reduce the space occupied by the platform in comparison to conventional approaches.

Each filter module may include at least one filtering component. The filtering component may include a first protecting part, a second protecting part, and at least one filter element. The first and second protecting parts may protect (e.g., shield from outside influence or contamination) the filter element. The filtering component may include at least one component inlet and at least one component outlet. The filter module may also include a module connecting inlet and a module connecting outlet. A downstream separation component (e.g., implemented as a plate or sheet of material) may be at one end of the filter module and an upstream separation component (e.g., implemented as a plate or sheet of material) may be at the other end of the filter module. Multiple filter modules may be arranged between separation components, as discussed in more detail below. The filter element may be arranged in a fluid-tight arrangement position between the first protecting part and the second protecting part. The filter module may include a handle for insertion of the module into and removal of the module from the filter system.

In general, a filter module may be configured for size exclusion (i.e., to retain or separate particles greater than a specified size), and/or chemical interaction (i.e., to gather or adsorb one or more functional groups of atoms or bonds within molecules).

The module connecting inlet may be fluidly connected to a filtering component inlet (e.g., an upstream filtering component inlet). The module connecting outlet may be fluidly connected to a filtering component outlet (e.g., a downstream filtering component outlet). Each filter element may have a corresponding filtering component inlet and a filtering component outlet.

The filter element comprises at least one filter medium, such as an adsorber (e.g., an adsorption membrane), a depth filter, or a body feed filter. The filter element may have exactly one filter medium. The filter element may also comprise filter media. For example, the filter element may have a plurality of membranes (e.g., membrane filters) in multiple layers. Similarly, a plurality of depth filters can be combined in a plurality of layers in the filter element.

The filter medium may have a substantially plate-shaped or flat configuration.

The filter modules may have different configurations. For example, a dead-end filter module may be configured for dead-end filtration, e.g., with a depth filter medium. In this configuration, waste may be collected in the filter medium as filter cake and fluid including constituents of interest may flow through the filter as filtrate.

An adsorption filter module may include an adsorber (e.g., a membrane adsorption filter medium). In this configuration, the flow of constituents of interest may depend on the adsorber (i.e., filter medium) used. More particularly, for a membrane adsorber module, constituents of interest in the fluid may be retained (adsorbed) on the filter medium and the fluid that passes through the filter medium may be collected for further processing or discarded. The retained constituents of interest may be removed (e.g., eluted with a solution that desorbs the constituents of interest) from the filter medium, possibly after purification (e.g., washing of the filter medium with a solution). Alternatively, the flow of (most) constituents of interest may be through the filter medium (i.e., as filtrate). In this case, residual constituents of interest left on the filter medium may be removed (e.g., eluted) for further processing (e.g., by additional filter modules), possibly after purification.

A TFF filter module may include a surface filter medium. In this case, constituents of interest from the fluid may be retained (i.e., as retentate) on the filter medium, e.g., on a retentate side of the filter element. The fluid may flow across the filter medium (i.e., tangentially to the filter medium) and may then be recirculated (possibly multiple times or continuously) in order to extract further constituents of interest. Accordingly, after a sufficient proportion of constituents of interest have been extracted from the fluid (e.g., at least 90% or at least 95%), or after a predetermined number of recirculations, the retained constituents may be purified (e.g., washed via diafiltration) and processed further (e.g., via conditioning or further filtering). Alternatively, the constituents of interest may be contained in the permeate that passes through the filter medium and may be processed further by the filter system (e.g., they may be purified with a buffer).

In some filter module configurations (e.g., the dead-end filter module or the adsorption filter module), the filter medium separates the retentate side of the filter element from a filtrate side of the filter element. The retentate side may be located on an upstream side of the filter medium and the filtrate side may be located on a downstream side of the filter medium.

The filtrate side may also be referred to as the permeate side. The fluid to be filtered flows from the retentate side toward the filtrate side. The fluid to be filtered may comprise a liquid in which solid substances are contained (e.g., a suspension) and/or a liquid in which substances are dissolved. The fluid may comprise a gas or an aerosol. The constituents (e.g., substances or particles) that are retained by the filter medium remain on the retentate side if they do not penetrate into the filter medium. The filtered fluid passes through the filter medium to the filtrate side of the filter medium. The filtered fluid may be referred to as a filtrate. There may be a fluid pressure difference between the retentate side and the filtrate side.

The retentate side and the filtrate side of the filter medium may form opposite sides of the filter medium. Further, the retentate side and the filtrate side may be at a shorter distance from one another than the two furthest longitudinal extents of the filter medium. In other words, the distance from the retentate side to the filtrate side may be less than the length of the filter medium. Further, the direction of flow of the fluid through the filter medium is oriented substantially perpendicular to the plane that is defined by the retentate side and the filtrate side. Thus, the effective cross-section of the filter medium through which the fluid to be filtered (i.e., feed) passes is maximized.

The filtering component inlet may be located upstream from the filter medium (e.g., on the first protecting part) and the downstream filtering component outlet may be located downstream from the filter medium (e.g., on the second protecting part). The module connecting inlet may be fluidly connected to the retentate side of the filter medium via the filtering component inlet, and the module connecting outlet may be fluidly connected to the filtrate side of the filter medium via the filtering component outlet.

In some of these filter module configurations (e.g., for the adsorption filter module), a second filtering component inlet may be provided. The filter medium may be loaded with a substance (e.g., a biomolecule such as a protein) contained in the fluid. In other words, the fluid may include the substance and the substance may be adsorbed by the filter medium. The second filtering component inlet may be used to introduce a medium (i.e., an intervening substance) to resolve (i.e., recover or elute) the substance in the filter medium. According to this approach, the adsorbed substance can be purified. The purified substance can then be collected (e.g., in a tank or vessel) for further processing. As an alternative to the second filtering component inlet, a fluid flow divider (e.g., a tee in conjunction with a valve) may be used to introduce the medium.

In such filter module configurations (e.g., the adsorption filter module), there may be various ways of processing depending on the filter media. For example, constituents of interest may be adsorbed and waste or impurities may pass through the filter. The adsorbed fluid constituents may be extracted (e.g., eluted). Extraction of fluid constituents may include purification, e.g., via washing. Alternatively, the constituents of interest may flow through the filter and waste (e.g., impurities) may be adsorbed. The configurations may depend on the adsorptive properties of the filter media (e.g., chromatography technique used).

In the filter module configurations described above (the dead-end filter module and the adsorption filter module), fluid may flow from the upstream separation component via the module connecting inlet and the filtering component inlet, through the filter medium and out the downstream separation component via the filtering component outlet and the module connecting outlet.

The separation interface may include multiple components. In particular, the separation interface may include one or more separation components, e.g., the upstream separation component and the downstream separation component.

In still other filter module configurations (e.g., a TFF or surface filtration module), the filtering component inlet and an upstream filtering component outlet may be located upstream of the filter medium (e.g., on the first protecting part). A downstream filtering component outlet may be located downstream of the filter medium (e.g., on the second protecting part). Fluid (i.e., feed) may flow from upstream and across the filter medium via the module inlet and the filtering component inlet. Fluid may exit out the upstream filtering component outlet as retentate. The retentate may include constituents of interest. The retentate may be recirculated across the filter medium to increase total recovery of constituents of interest (e.g., product) from the fluid. The retentate may be further processed (e.g., via diafiltration). In addition, fluid that passes through the filter medium (i.e., permeate) may also contain constituents of interest. The permeate may flow out from the downstream separation component via the downstream filtering component outlet and the modular connecting outlet.

Similar to the adsorption filter module, the TFF filter module may also include multiple filtering component inlets, where one inlet may be used for the fluid including constituents of interest (i.e., feed) and the other inlet may be used to introduce a purifying agent (e.g., a buffer for diafiltration). Accordingly, the fluid flow divider (e.g., tee and valve) may be used as an alternative to the second filtering component inlet.

Different filter media may be combined in a filter element. For example, a plurality of layers of a membrane filter media can be arranged between at least two layers of depth filter media or between two screen layers, in order to protect the membrane filter media layers against particulate loading or clogging.

The filter medium may have a single function, e.g., retaining a specified substance (e.g., particles or impurities in the fluid). Alternatively, the filter medium may have multiple functions (e.g., retaining a specified substance and chromatography).

Examples of filter media include non-woven fabrics, felts, spun bonded material, porous solids, sintered metals, ceramics, woven fabrics, paper, membranes, alone or in combination. Furthermore, pre-coated filter media with filter aids (for example, diatomite and/or adsorptive particles) can be used, the filter aids being fed in together with the fluid to be filtered or already being present in the filter module.

The filter medium can be formed from two, three, or more layers. The filter medium may be formed by multiple identical layers or by way of different layers. Three or more filter media may be arranged in the filter element. The filter media may be fastened to the filter element.

The arrangement position denotes a state of a filter module in which the filter module is arranged on further filter modules and can be connected to (or is connected to) the further filter modules.

The filter module may have a cassette format. Particularly by means of the cassette format, the filter modules may be used to create a filter system having a smaller footprint in comparison to conventional systems. The filter modules may be installed into a single filter system or into multiple filter systems interconnected so as to constitute (i.e., form or make up) the platform. Filter modules having different functions (heterogeneous modules) may be arranged within the same filter system. For example, filter modules (i.e., cassettes) having different filtration grades or filter media having different structures may be arranged together in the same filter system. Filter modules may be arranged within the filter system depending on the product to be produced. Arranging processing steps (e.g., chromatography processing, cell harvesting) as cassettes within the filter system may require less hardware and floor space in comparison to conventional approaches, such as the use of chromatography columns.

Advantageously, the filter element with the filter medium is protected against external mechanical and chemical influences by means of the first and second protecting parts. In particular, the protecting parts form a contact protection means with regard to the filter medium, with result that the filter element and the filter medium cannot be touched by hand. As a result, mechanical damage of the filter medium and contamination by way of contact can be avoided. Further, the contact protection means (i.e. the protecting parts) enable thinner filter media to be used, since the filter media do not need to be designed for mechanical loading (e.g., loading by hand). Moreover, filter media in different filter modules are automatically spaced apart in view of the intervening protecting parts of the respective filter modules. Accordingly, it is not necessary to determine appropriate spacing between filter media held in different modules.

A fluid-tight connection may be effected by arrangement of the filter element between the first protecting part and the second protecting part. A contact pressure may be applied to press the upstream side of the filter element on to the first filter element arrangement side of the first protecting part and the downstream side of the filter element on to the second filter element arrangement side of the second protecting part. As a result, a fluid-tight seal is produced, which prevents fluid from escaping at the connecting faces between the filter element and the first and second protecting parts.

The filter element may include a filter medium holder to hold the filter medium in place. The filter medium holder may be implemented as a sealing gasket (e.g., a rubber border) for facilitating the fluid-tight connection. Alternatively, the filter element may be held in place between the first protecting part and the second protecting part without the filter medium holder.

The first protecting part and the second protecting part may be locked together or connected to one another by a locking device. The first protecting part may have at least one matching device that is latched to a complementary latching device in the arrangement position. For latching or locking, the at least one latching device can be introduced along an arrangement direction into the associated complementary latching device, until the latching takes place and the filter module moves into the arrangement position. Further, the latching may be irreversible as soon as the filter module is situated in the arrangement position. This may prevent the filter module from being subsequently opened. Accordingly, damage to the filter medium may be prevented. Further, the filter module may be designed to be disposable, such that the filter module is thrown away or destroyed after use. Thus, access to the filter element or filter medium may be unnecessary.

A first sealing region of a filter element can be in contact with a complementary sealing region of the first protecting part, such that there is a fluid-tight connection between the filter element and the first protecting part. Thus, the upstream side of the filter element may be against an upstream side of the first protecting part in the arrangement position. Further, a second sealing region of the filter element may make contact with a complementary sealing region of the second protecting part in a fluid-tight manner. Accordingly, in the arrangement position, the filtrate side of the filter medium may be against a downstream side of the second protecting part.

The protecting parts may be formed from a rigid material such as polyethylene, polypropylene, polyurethane, acrylonitrile butadiene styrene copolymer, polyimide, or polycarbonate. Further, the protecting parts may be able to withstand forces that act on the filter module from the outside, particularly if one of the sets of filter modules includes multiple filter modules. For example, a plurality of the filter modules may be combined and pressed together with a pressing force that presses the filter modules together in order to obtain a fluid-tight connection between the filter modules. The materials used for the filter protecting parts may allow the protecting parts to resist pressure resulting from passage of the fluid to be filtered and/or contact pressure applied to hold the filter modules together. Further, the filter protecting parts may protect the filter medium against outside forces, enabling filter media to be thinner and still have the same filtration capability. Less expensive filter media can be provided as a result.

The first protecting part may be identical to the second protecting part. In particular, the first and second protecting parts may be symmetrical with respect to a center point of each of the protecting parts. In other words, the protecting parts may be symmetrical with respect to a mirror axis.

A filter module connection element may be formed on a side of the first protecting part that is opposite to the first filter element arrangement side of the first protecting part. The filter module connection element may facilitate connection of a further filter module to the filter module in a fluid tight manner. The further filter module may have a complementary filter module connection element. Each filter module connection element may comprise a sealing web around the module inflow channel and/or the module outflow channel. As an alternative, sealing rings can be provided to facilitate the fluid-tight connection. The sealing rings may be held in complementary sealing ring groups of the corresponding filter cassette parts. The sealing rings may be formed from an elastomer.

Each filter module in the first set of filter modules and/or the second set of filter modules may have a corresponding filter module connection element for connecting filter modules to each other.

The filter module may comprise a third protecting part and a second filter element. The second filter element may be identical to the first filter element. Accordingly, the first filter element may be arranged on the first protecting part and the second filter element may be arranged on the second protecting part. The third protecting part may be arranged between the first and second filter elements.

The third protecting part may have a third filter element arrangement side that is identical to the second filter element arrangement side of the second protecting part. The third protecting part may have a fourth filter element arrangement side that is identical to the first filter element arrangement side of the first protecting part.

The third protecting part may separate the first protecting part and the first filter element from the second protecting part and the second filter element. Accordingly, a single filter module may be used to carry out (e.g., different) filter processes at the same time or in series.

Two filter elements may be accommodated in a single filter module by means of the third protecting part. The third protecting part can be locked together with the first and second protecting parts in the arrangement position, e.g., by means of the locking device. The lock between the first and second protecting parts may be replaced by an indirect lock via the third protecting part.

The first protecting part may have a first ventilation channel that may be fluidly connected to the retentate side of the filter element. Further, the second protecting part may have a second ventilation channel. In the arrangement position of the filter module, a module ventilation channel may be formed by means of the first ventilation channel and the second ventilation channel. Accordingly, air can be discharged from the internal volumes of the filter system by means of the module ventilation channel before fluid is received through the fluid inlet. The module ventilation channel may be connected to the outside until ventilation is complete and fluid is received into the module ventilation channel. Afterwards, the connection can be disconnected. In particular, the connection to the outside can take place via a sterile filter that may retain microorganisms, such as bacteria, funguses or viruses.

The first protecting part may have a first drainage channel. The second protecting part may have a second drainage channel. In the arrangement position of the filter module, a module drainage channel may be formed by means of the first drainage channel and the second drainage channel. At the end of filtration, fluid may be discharged from the internal volumes of the filter system by means of the module drainage channel.

In some cases, the at least one filter system further comprises a first separation component and a second separation component. The first separation component may include the fluid inlet. The second separation component may include the fluid outlet. Alternatively, the second separation component may be connected to the fluid outlet. The sets of filter modules may be arranged between the first separation component and the second separation component.

The first separation component may include at least one first module connection element. Accordingly, the first separation component may be connected to the first set of filter modules via the first module connection element. Similarly, the second separation component may have at least one second module connection element. Accordingly, the second separation component may be connected to the second set of filter modules via the second module connection element. In particular, the module connection elements of the separation components may be connected to complementary module connection elements on the sets of filter modules. The separation components may be referred to as end adapters.

The separation components and the sets of filter modules arranged between them may be pressed together via a pressing force by way of a pressing apparatus. As a result, the filter module connection elements and the associated complementary filter module connection elements may be connected together via a predefined contact pressure. The pressing force may be applied by means of the pressing apparatus on the side of the first separation component and may act in the direction of the second separation component. Correspondingly, an equal pressing force may be applied on the side of the second separation component in the direction of the first separation component.

The fluid to be filtered (i.e., feed), purifiers (e.g., a washing buffer), and stabilizers may be fed into the filter system via the first separation component. Fluid including constituents of interest may exit the filter system via the second separation component. The fluid exiting the filter system may be the product, or may be processed further.

The filter system may further comprise a third set of one or more filter modules. The third set of filter modules may include a module inflow channel and a module outflow channel. The third set of filter modules may differ from the first set of filter modules. The third set of filter modules may differ from the second set of filter modules. The at least one filter system may further comprise a second separation interface separating the second set of filter modules from the third set of filter modules. The second separation interface may comprise a third interface channel to be fluidly connected to the module outflow channel of the second set of filter modules. The second separation interface may comprise a fourth interface channel to be fluidly connected to the module inflow channel of the third set of filter modules. The at least one external auxiliary element may include a first external auxiliary element and a second external auxiliary element.

The fluid received and processed by the first external auxiliary element may be retentate. The fluid discharged to the second set of filter modules via the first interface channel may include constituents of interest derived from the retentate.

The second external auxiliary element may receive fluid containing constituents of interest from the first auxiliary element or from the second set of filter modules, depending on the processing steps required to produce the product. The second auxiliary element may adjust the pH of the received fluid. The second auxiliary element may discharge the adjusted and processed fluid to the third set of filter modules via the second interface channel.

Accordingly, the platform may include a combination of filter systems and auxiliary elements performing various functions, depending on the product to be produced and the properties of the fluid. For example, the first auxiliary element may be included in the platform without the second external auxiliary element. Alternatively, the second external auxiliary element may be included in the platform without the first external auxiliary element. Further, either of the first or the second external auxiliary element may be included in the platform without the third set of filter modules and/or without the second separation interface.

Other combinations of filter modules separation interfaces and external auxiliary elements are also possible. In particular, the platform may be arranged to produce a variety of different products. The products produced may be biological, pharmaceutical, and/or chemical products. In particular, biopharmaceutical products may be produced. For example, in one configuration, a viral vaccine may be produced. In a different configuration, the platform may be used to produce monoclonal antibodies. The combination of various external auxiliary elements and the flexible modification of the filter system by rearranging or replacing filter modules may enable the platform to be used to produce a wide variety of products. Further, the small footprint enabled via use of the filter system may be maintained in spite of the presence of the external auxiliary element(s).

The filter system may be located in a relatively small area having space only for the system itself and operator configuration or maintenance of the filter system. Auxiliary elements, purifying agents, and the fluid to be filtered, may be delivered from a space separate from the filter system and the outlet of the platform may be in a further separate space, for storage of the processed fluid or additional processing. Alternatively, auxiliary elements, tanks for purifying agents, tanks for purging agents, pumps, hosing and tubing, and sensor arrays may be arranged and moved around the platform as mobile units. Use of mobile units may optimize the operation of the platform, thus keeping the space requirements small and enabling flexible operation. The overall footprint may be determined by requirements of process step to effect a desired level of purification. One set of filter modules may be larger or smaller than another set of filter modules; adsorptive capacity may be larger or smaller, and therefore need more or fewer filter modules.

At least one of the filter elements of the first set of filter modules may include a first depth filter medium. At least one of the filter elements in the second set of filter modules may include a second depth filter medium. The second depth filter medium may have a finer filtration grade than the first depth filter medium. For example, the first depth filter medium may be able to cause the retention of particles having a size (e.g., diameter) of between about 1.5 µm and about 20 µm. Further, the second depth filter medium may be able to cause the retention of particles having a size (e.g., diameter) of between less than approx. 0.1 µm to approx. 1 µm.

At least one of the filter elements of the first set of filter modules may include a first membrane. At least one of the filter elements in the second set of filter modules may include a second membrane. The membranes may be membrane filters (retaining particles of greater than a specified size) or membrane adsorbers (gathering one or more functional groups of atoms via chemical interaction). One of the following may apply:
  at least one of the membranes is an adsorber and/or antibody polisher,
  at least one of the membranes is a sterilizing grade filter,
  at least one of the membranes is a microfiltration filter and/or a nano-filter,
  at least one of the membranes is an ultrafiltration and/or diafiltration filter,
  at least one of the membranes is operable to adsorb via affinity chromatography, such as protein A capture,
  at least one of the membranes is operable to adsorb via non-affinity chromatography, wherein the membrane may be an ion exchange chromatography filter, possibly containing ligands of multimodal functionality that adsorb protein via a combination of ionic interactions, hydrogen bonds and/or hydrophobic interactions,
  at least one of the membranes includes a quaternary amine ligand,
  at least one of the membranes includes a polyallylamine ligand.

The filter system may include various combinations of membrane filter media. For example, the filter system may combine one or more of the following:
  affinity (e.g., metal affinity or protein A capture) filter media, non-affinity filter media,
depth filter media,
adsorption (including various ligands, such as quaternary amine ligands and polyallylamine ligands)
nanofiltration, ultrafiltration, microfiltration,
surface filtration (possibly including diafiltration),
sterilization,
multimodal filters.

The filter system may also include filter media having multiple functional elements, such as particle removal and chromatography. Other combinations of depth filter media, adsorption filter media, and/or surface filter media are also possible.

In some cases, at least one of the filter elements in either the first set of filter modules or the second set of filter modules may include a body feed filter medium and/or a bioburden control filter medium.

The filter modules in the first set of filter modules may be identical to each other. The filter modules in the second set of filter modules may be identical to each other.

Each filter module may be held in place by a module holder. The module holder may include two module supports (e.g., tubes or rods) that are parallel to one another and spaced apart from one another, and can be received by holder receptacles of the filter module. Via the module holder and the pressing apparatus, a displacement of the filter module toward either one of the separation components can be prevented.

According to another aspect, a method is provided. The method may comprise configuring a filter system to produce a first product. The filter system may comprise a first set of one or more filter modules and a second set of one or more of filter modules. At least one of the filter modules in the first set of filter modules is different from at least one of the filter modules in the second set of filter modules. In particular, the filter media of the first set of filter modules may be different from the filter media of the second set of filter modules.

Each set of filter modules includes a module inflow channel and a module outflow channel. The filter system further comprises a fluid inlet fluidly connected to the first set of filter modules. The filter system further comprises a fluid outlet fluidly connected to the second set of filter modules.

The method further comprises receiving, by the filter system, fluid through the fluid inlet. After the fluid has passed through each set of filter modules, the method further comprises discharging the fluid through the fluid outlet.

The method further comprises configuring the filter system to produce a second product, wherein the second product is different from the first product. The configuring comprises exchanging (i.e., swapping) at least one of the sets of filter modules with a third set of filter modules. For example one set of filter modules near the middle of the filter system and another set of filter modules at an end of the filter system may be exchanged for the third set of filter modules. The total number of sets of filter modules in the resulting filter system will then be one fewer than the number of sets of filter modules in the original filter system.

After the exchange, the set of filter modules that has been exchanged for the third set of filter modules will no longer be part of the first system, i.e., the exchanged set of filter modules has been swapped out. The third set of filter modules differs from the at least one of the sets of filter modules. In other words, the third set of filter modules differs from the exchanged (i.e., swapped out) set of filter modules, i.e., the third set of filter modules differs from the set of filter modules that the third set of filter modules has been exchanged with. In particular, the filter media in the third set of filter modules may differ from the filter media in the at least one of the sets of filter modules.

The exchanging may be carried out in order to produce a different product. In particular, before the exchanging, the filter system may be used to produce the first product. After the exchanging, the filter system may be used to produce the second product, which different from the first product; each of the products is a chemical, pharmaceutical or biological product. In this way, a filter system configuration for producing the first product may be easily and flexibly changed to a different filter system configuration for producing the second product.

DETAILED DESCRIPTION

In the following text, a detailed description of examples will be given with reference to the drawings. It should be understood that various modifications to the examples may be made. In particular, one of more elements of one example may be combined and used in other examples to form new examples.

As used herein, the singular forms "a", "an," and "the" include plural unless the context clearly dictates otherwise.

In the context of the present application, when a filter module includes a filter, this may be understood to mean that a filter element of the filter module includes a filter medium with the filter.

Figure 1:
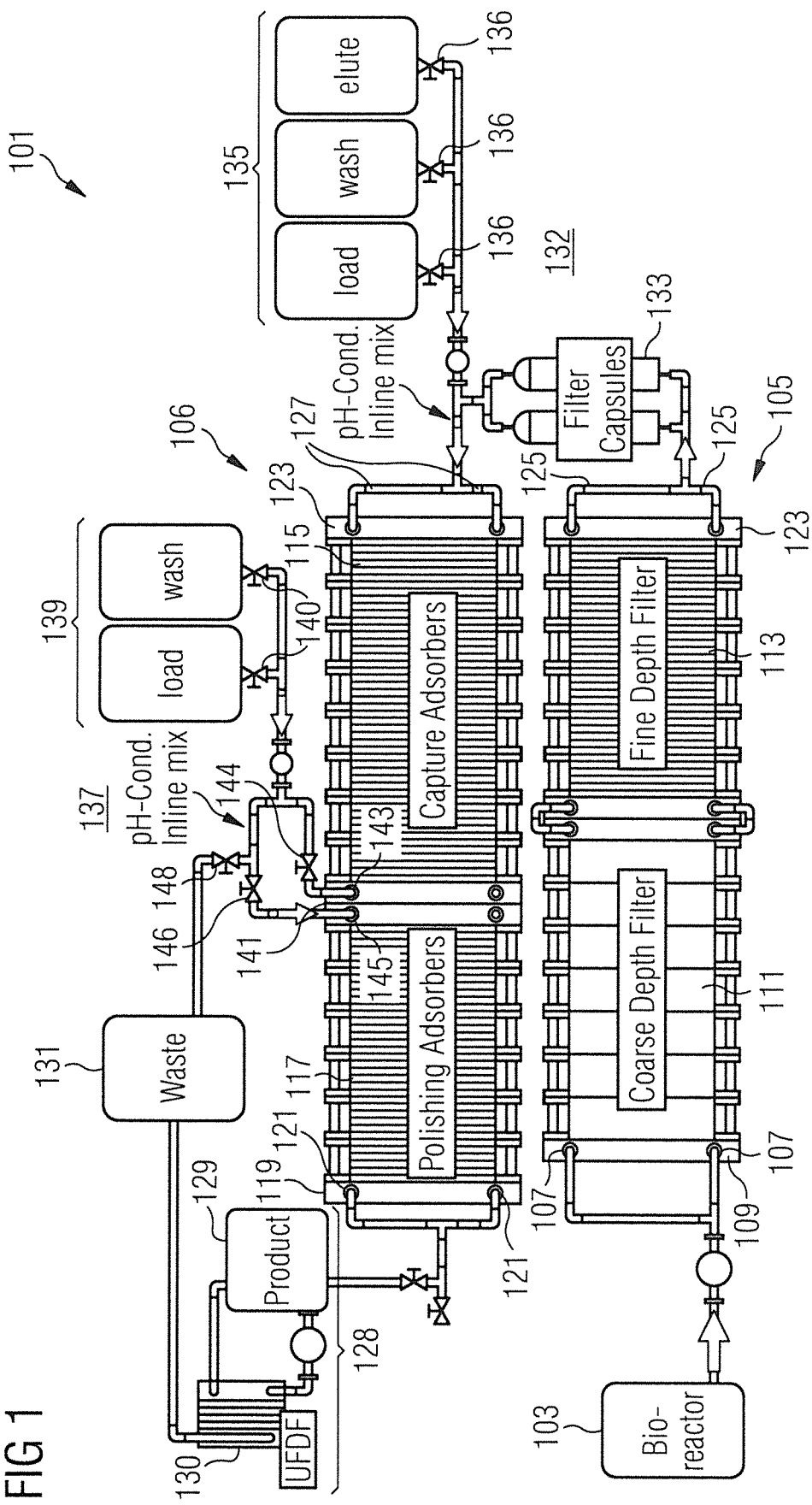
FIG. 1 shows a platform including two filter systems and a plurality of external auxiliary elements.

FIG. 1 shows a platform 101 for processing a fluid. The platform 101 may be used to perform particle separation and/or purification of the fluid, e.g., in order to limit the contents of the fluid (as far as possible) to constituents of interest. In particular, the platform 101 may receive a feed as fluid and produce a chemical, pharmaceutical, and/or biological product from the feed. More particularly, the platform 101 may be used to produce a biopharmaceutical product.

The platform includes a bioreactor 103. The bioreactor 103 may be implemented as a 10 liter Biostat C bioreactor, as manufactured by Sartorius AG, including control and inline measurement capability. In particular, the bioreactor 103 may be capable of controlling and measuring the following: temperature, pH, dissolved oxygen concentration, cell density of cells contained in the bioreactor, near infrared spectroscopy. The bioreactor 103 may be capable of recording a variety of measurements using various measurement devices. The bioreactor 103 may be capable not only of fermentation but also of developing mammalian cell cultures.

To summarize the depicted example, the platform 101 may process the fluid using multiple sets of depth filter modules (i.e., via dead-end filtration to produce a filtrate), each set having filter media of a different filtration grade. Further purification and particle separation may be performed via various members (e.g., membrane adsorbers). In particular, purification may be performed using membranes in a self-contained filter unit. After this processing, the filtrate (fluid) may be loaded (e.g., adsorption may be facilitated via a protein that is added to the fluid) onto a set of adsorption filter modules. Constituents of interest in the fluid may bind to the set of adsorption filter modules, while waste flows onward as filtrate. The bound constituents of interest may be purified (e.g., by washing out impurities using a buffered saline). The bound constituents of interest may then be removed (e.g., eluted) from the set of adsorption filter modules, and then fluid containing the constituents of interest may be directed to another set of adsorption filter modules. Filtrate including (most of) the constituents of interest continues through the other set adsorption filter modules. Other substances in the fluid (e.g., impurities), along with residual constituents of interest, may bind to the other set of adsorption filter modules. The residual constituents of interest may then be washed out.

The platform 101 may include at least one filter system. In particular, the platform 101 may include the filter system 105 and the filter system 106. Fluid from the bioreactor 103 may flow to the filter system 105. In particular, fluid from the bioreactor 103 may be received through a fluid inlet 107 of the filter system 105. The fluid inlet 107 may be part of a separation component 109.

The filter system 105 includes a set of one or more filter modules 111 and a set of one or more filter modules 113. In this case, each filter module in the set of filter modules 111 and the set of filter modules 113 includes a depth filter. The set of filter modules 113 may include depth filters having a smaller pore size (e.g., diameter) than the filters of the set of filter modules 111. In other words, filter elements of the filter modules in the set of filter modules 111 may include filter mediums having a finer filtration grade than filter mediums in the filter elements of the set of filter modules 111.

The filter system 106 includes a set of one or more filter modules 115 and a set of one or more filter modules 117. The set of filter modules 113 may be considered a first set of filter modules and the set of filter modules 115 may be considered a second set of filter modules. Alternatively, the set of filter modules 115 may be considered the first set of filter modules and the set of filter modules 117 may be considered the second set of filter modules. Other combinations are also possible.

The set of filter modules 115 and the set of filter modules 117 may include membrane adsorbers and/or antibody polishers, i.e., the sets of filter modules 115 and 117 may be adsorption filter modules. In particular, the set of filter modules 115 and the set of filter modules 117 may be operable to adsorb via non-affinity chromatography. More particularly, the set of filter modules 115 and the set of filter modules 117 may include ion exchange chromatography filters. The set of filter modules 115 may be used for initial capture of one or more target molecules. In particular, the set of filter modules 115 may include filters having quaternary amine ligands in order to perform anion exchange chromatography (AEX). In contrast, the set of filter modules 117 may include filters capable of efficiently removing contaminants with a relatively low acidity. Moreover, the set of filter modules 117 may be capable of capturing target molecules when the fluid has a relatively high conductivity or salt concentration (e.g., at least 10 millisiemens/centimeter, at least 12 mS/cm or at least 16 mS/cm). More specifically, the set of filter modules 117 may include filters having polyallylamine ligands, e.g., for Salt-tolerant interaction chromatography (STIC). In addition, the set of filter modules 117 may including filters having a double porous structure. More particularly, filters in the set of filter modules 117 may comprise cross-linked cellulose hydrate membranes as described in U.S. Pat. No. 5,739,316 (Beer).

The filter system 106 may include a separation component 119, including a fluid outlet 121.

A separation interface 123 separates the set of filter modules 113 from the set of filter modules 115. The separation interface 123 may include a first interface channel 125, fluidly connected to a module outflow channel of the set of filter modules 113. The separation interface may further include a second interface channel 127, fluidly connected to a module inflow channel of the set of filter modules 115. Constituents of interest retained by the set of filter modules 115 may be processed via the filter support means 135. This may involve eluting constituents of interest from the set of filter modules 115 via the second interface channel 127, purifying them and discharging purified constituents of interest back into the filter system 106.

Accordingly, the filter system 105 receives fluid through the fluid inlet 107 from the bioreactor 103. After the fluid has passed through the sets of filter modules 111, 113, 115 and 117, the fluid is discharged through the fluid outlet 121.

The platform 101 may include at least one external auxiliary element. In particular, the platform may include an external auxiliary element 128. The discharged fluid may flow into the external auxiliary element 128 from the fluid outlet 121. The external auxiliary element 128 may perform additional purification of the fluid, e.g., so that constituents of interest may be concentrated and the fluid includes minimal impurities. The external auxiliary element 128 may include a tank 129 for storing the fluid as chemical, pharmaceutical, and/or biological product. In addition, the external auxiliary element 128 may include a set of filter modules 130.

The set of filter modules 130 may be TFF filter modules (e.g., ultrafiltration/diafiltration modules), including surface filter media. Accordingly, waste or impurities may flow through the set of filter modules 130, while fluid including constituents of interest is retained and stored in the tank 129. The fluid in the tank 129 may be recirculated through the set of filter modules 130 for further concentration. When the concentration process is complete, residue from the set of filter modules 130 may be washed into a tank 131. The tank 131 may also be used to store waste from the set of filter modules 115 and/or the set of filter modules 117.

In addition, the platform may include an external auxiliary element 132. The external auxiliary element 132 may include a self-contained filter unit 133. In the depicted example, the self-contained filter unit 133 includes a plurality of filter capsules. More particularly, the self-contained filter unit 133 includes membrane filter capsules (e.g., sterilizing grade filters) capable of purifying the fluid. The self-contained filter unit may have a porosity (i.e., rated porosity) of about 0.05 µm to about 1 µm, about 0.075 µm to about 0.75 µm, or about 0.1 µm to about 0.45 µm.

The external auxiliary element 132 may include filter support means 135. The filter support means 135 may store a loading agent (e.g., biomolecules) for loading the sets of filter modules 115 in order to facilitate adsorption of constituents of interest from the fluid. In addition, the filter support means 135 may store a purifying agent (e.g., a washing buffer) to purify the constituents of interest adsorbed by the sets of filter modules 115. Further, the filter support means 135 may store an eluting agent to elute the purified constituents of interest from the set of filter modules 115. In particular, valves 136 may cause the loading agent, purifying agent, or eluting agent to flow into the set of filter modules 115.

The platform 101 may further include external auxiliary element 137. The external auxiliary element 137 may include filter support means 139. The filter support means 139 may be similar to the filter support means 135. Similar to the valves 136, valves 140 may be used to cause a loading agent or a purifying agent to flow to the set of filter modules 117. In the case of the set of filter modules 117, the loading agent may be used to cause substances (e.g., impurities or contaminants) in the fluid to bind to the set of filter modules 117. The fluid including (most of) the constituents of interest may flow through the set of filter modules 117 as filtrate. The eluting agent is not used on the set of filter modules 117, since most of the constituents of interest flow through the set of filter modules 117 as filtrate and only residual constituents of interest bind to the set of filter modules 117. However, the purifying agent may be used to wash out the residual constituents of interest from the set of filter modules 117. The residual constituents of interest may be incorporated into the product in the tank 129.

The filter system 106 comprises separation interface 141. The separation interface 141 may separate the set of filter modules 115 from the set of filter modules 117. The separation interface 141 may include a first interface channel 143, fluidly connected to a module outflow channel of the set of filter modules 115. Further, the separation interface 141 may include a second interface channel 145, fluidly connected to a module inflow channel of the set of filter modules 117.

The first interface channel 143 comprises a valve 144 and the second interface channel 145 comprises a valve 146. The valves 144 and 146 may be used to control the flow of fluid from the set of filter modules 115 to the set of filter modules 117 and to regulate the loading and washing of the set of filter modules 117. A valve 148 controls the flow of waste from the set of filter modules 115 to the tank 131. In particular, while the fluid is flowing through the set of filter modules 115, the valves 144 and 148 may be open and the valve 146 may be closed to allow fluid containing contaminants or impurities to flow into the tank 131.

The separation interfaces 123 and 141 may each consist of two separation components, e.g., similar (or identical) to the separation components 109 and 119. Although each separation interface 123 and 141 is depicted as having four channels (e.g., two upstream inlets and two downstream outlets), it may be that an upstream separation component of each separation interface 123 and 141 has only one inlet and a downstream separation component of each separation interface 123 and 141 has only one outlet, as shown with respect to the separation components depicted in FIGS. 9 to 11.

As part of an elution process for the set of filter modules 115, the valve 148 may be closed and the valve 146 may be opened. Constituents of interest may be eluted from the set of filter modules 115 using the external auxiliary element 132. Fluid including the constituents of interest may flow to the set of filter modules 117 for further processing.

The valves 140, 144 and 146 may also be used to control the operation of the set of filter modules 117. In particular, contaminants or impurities from the fluid may be retained in the filter media of the set of filter modules 117, while fluid including constituents of interest flows to the external auxiliary element 128. After the fluid including constituents of interest has flowed to the external auxiliary element 128, the valve 144 may be closed and the valve 146 may be opened. The filter support means 139 may then be used (e.g., via the control system) to extract residual constituents of interest from the set of filter modules 117 and also to remove the contaminants or impurities retained by the set of filter modules 117.

Although valves are discussed in the description above, other fluid flow control means (actuators) may also be used.

A control system may be used to control the platform 101.

The control system may control not only the filter system 105 and additional filter systems such as the filter system 106, but also the bioreactor 103 and the external auxiliary elements (e.g., the external auxiliary elements 132 and 137). Thus, the control system may maintain overall system automation and data acquisition.

The control system may use supervisory control and data acquisition (SCADA). Accordingly, network communications from various components of the system to a central terminal may enable the entire platform 101 to be controlled from the terminal of the control system.

Figure 2:
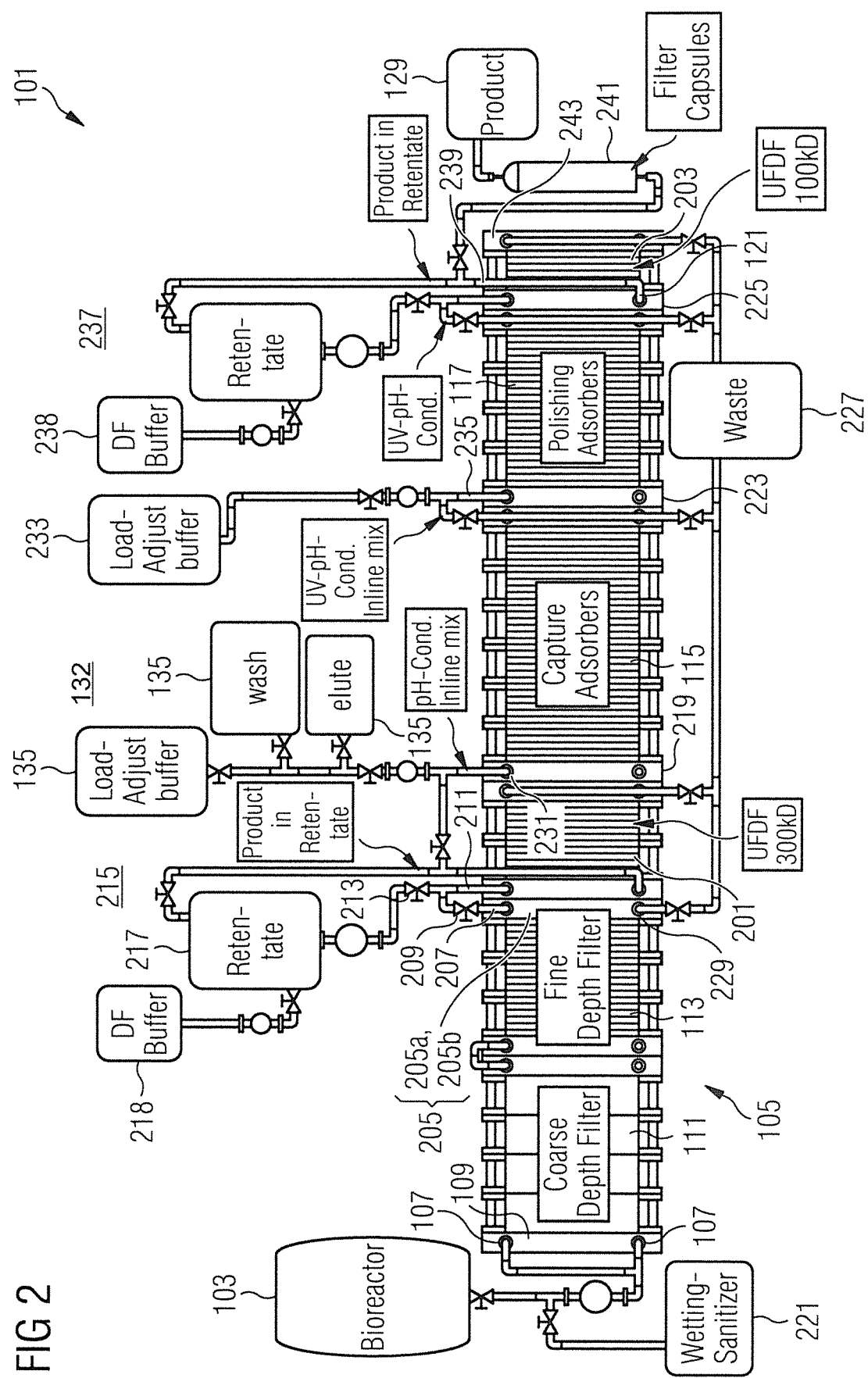
FIG. 2 shows a platform including a filter system and a plurality of external auxiliary elements.

FIG. 2 shows the platform 101 in a different configuration, e.g., to produce a different product in comparison to the configuration depicted in FIG. 1. In particular, the self-contained filter unit 133 has been replaced by a set of one or more filter modules 201. Thus, the external auxiliary element 132 includes the filter support means 135, but not the self-contained filter unit 133.

The set of filter modules 201 may be a set of TFF filter modules. More specifically, the set of filter modules 201 may be ultrafiltration diafiltration (UFDF) filter modules. Even more specifically, the set of filter modules 201 may be capable of removing particles having a nominal molecular weight cutoff of greater than 300 kD.

In addition, the filter system 105 includes a set of one or more filter modules 203. The set of filter modules 203 may be implemented as ultrafiltration diafiltration filter modules. In particular, the set of one or more filter modules 203 may have a nominal molecular weight cutoff of between about 2 kD and about 100 kD. More particularly, the set of filter modules 203 may have a nominal molecular weight cutoff of about 100 kD (i.e., the set of filter modules 203 may remove particles having a nominal molecular weight cutoff of greater than about 100 kD). In comparison to the set of filter modules 201, the set of filter modules 203 may have a finer filtration grade. The set of filter modules 203 may be an exchange buffer for formulation.

Further differences between the configuration of FIG. 1 and the configuration of FIG. 2 are that the filter system 106 is no longer part of the platform 101 and that the filter system 105 further includes a separation interface 205, separating the set of filter modules 113 from the set of filter modules 201.

The separation interface 205 may include a separation component 205a and a separation component 205b. The separation component 205a may be fluidly connected to the first interface channel 207. The separation component 205b may be fluidly connected to a second interface channel 211. The second interface channel 211 may be fluidly connected to a module inflow channel of the set of filter modules 201.

The first interface channel 207 may include a valve 209. The second interface channel 211 may include a valve 213. The valves 209 and 213 may be used to control whether retained constituents from the set of filter modules 201 are further processed by an external auxiliary element 215. In particular, the valves 209 and 213 may control a TFF recirculation path for the set of filter modules 201. Accordingly, fluid may flow out of the set of filter modules 201 via the separation interface 205 to the tank 217 of the external auxiliary element 215. The separation interface 205 may be fluidly connected to the module outflow channel (not shown) of the set of filter modules 201. Valves may control whether fluid flows to the tank 217 or toward the set of filter modules 115. Other fluid flow control means (actuators) may also be used. The external auxiliary element 215 may also receive fluid from the set of filter modules 201 via the second interface channel 211.

After being processed by the external auxiliary element 215, the fluid may flow back into the set of filter modules 201 via the second interface channel 211. After being sufficiently purified, fluid from the set of filter modules 201 may flow from the external auxiliary element 215 to the set of filter modules 115.

Processed fluid (e.g., from the set of filter modules 201) may be further processed in a tank 217. In particular, processing of the fluid from the set of filter modules 201 may comprise diafiltration, e.g., via a diafiltration buffer 218 included as part of the external auxiliary element 215. In the context of the present application, diafiltration may be a dilution and/or buffer exchange process that involves removal or separation of components (permeable molecules like salts, proteins, solvents) from the fluid based on their molecular size using micro-molecule permeable filters in order to purify the fluid. A micro-molecule may be a freestanding molecule (e.g., water, ethane, methane) or a monomer unity.

Usable product may be retained by the set of filter modules 201. Accordingly, the external auxiliary element 215 may be used to process and extract usable product fluid constituents retained by the set of filter modules 201. This may have the effect of maximizing the amount of usable product obtained per unit of fluid processed by the platform 101.

A separation interface 219 separates the set of filter modules 201 from the set of filter modules 115. The separation interface 205 may enable further purification of fluid from the set of filter modules 113. Similarly, the separation interface 219 may facilitate further purification of constituents retained by the set of filter modules 201. Further, the separation interface 219 may also include two separation components, one functioning as an inlet, the other as an outlet. The separation component functioning as an inlet may be connected to a second interface channel 231.

In general, when a separation component is not connected to an interface channel, the inlet(s) or outlet(s) of the separation component are blocked, so that fluid cannot enter or exit, respectively.

Moreover, the filter system 105 may be configured to receive sanitizer from a sanitizer tank 221. The sanitizer may flow through the filter system 105.

Waste from sanitizing may be discharged via the separation interface 205 and the separation interface 219. In addition, sanitizer waste may be discharged via separation interface 223 and separation interface 225. Similar to the separation interfaces 205 and 219, the separation interfaces 223 and 225 may each include two separation components. A separation component of the separation interface 223 may be fluidly connected to a second interface channel 235 and may function as an inlet.

Further, a separation component of the separation interface 225 may be fluidly connected to the fluid outlet 121 and the interface channel 239. In particular, depending on a purity of the fluid, the fluid may either flow from the separation interface 225 to a self-contained filter unit 241 (e.g., if the fluid is sufficiently pure) or to the external auxiliary element 237 for further purification and/or recirculation.

Sanitizer waste may be stored in a waste tank 227. The sanitizer waste may be discharged via an interface channel 229 of the separation interface 205. The sanitizer waste may be similarly discharged from the separation interfaces 219, 223, and 225.

Fluid from the set of filter modules 201 may be extracted via the separation interface 219. Accordingly, processed fluid including constituents of interest retained by the set of filter modules 201 may be further processed via the external auxiliary element 215. This may involve gathering the fluid in the tank 217 and recirculating the fluid to the set of filter modules 201 using the valves 209 and 213, as described above. In addition or alternatively, the processed fluid may be purified e.g., via diafiltration and the diafiltration buffer 218. After processing, processed fluid may be discharged to the set of filter modules 115 via the separation interface 219 and the second interface channel 231. The separation interface 219 may also be used for loading and eluting the set of filter modules 115 using the external auxiliary element 132, as described above in the context of the separation interface 123.

Processing via the external auxiliary element 132, particularly the filter support means 135, may enable the fluid (e.g., fluid constituents extracted via the set of filter modules 201) to be filtered via the set of filter modules 115 without damaging or significantly reducing the useful life of the set of filter modules 115. Further, the processing may enable a greater amount of product to be produced per unit volume of fluid from the bioreactor 103.

Fluid may be extracted via the set of filter modules 115 and processed via an external auxiliary element, particularly via a filter support means 233. In particular, the fluid may be adjusted for further processing by the set of filter modules 117 via the filter support means 233, and one or more UV and pH conductivity sensors. After processing the fluid, the processed fluid may be discharged to the set of filter modules 117 via the second interface channel 235 of the separation interface 223.

Although downstream interface channels for separation interfaces 223 and 225 are not shown in FIG. 2, such interface channels may be present. In particular, in addition to the second interface channel 235 (upstream), the separation interface 223 may also have at least one downstream interface channel. Accordingly, the separation interface 223 may function similarly to the separation interface 141. Similarly, in addition to the two upstream interface channels shown for the separation interface 225, the separation interface 225 may have at least one downstream interface channel.

The filter support means 233 may store a loading agent, e.g., as described above in the context of the filter support means 135. In addition, the filter support means 233 may store a purifying agent (e.g., a washing buffer) to purify the constituents of interest adsorbed by the sets of filter modules 115. Further, the filter support means 135 may store an eluting agent to elute the purified constituents of interest from the set of filter modules 115. In particular, valves 136 may cause the loading agent, purifying agent, or eluting agent to flow into the set of filter modules 115.

Similar to the separation interface 205, fluid may be extracted via the set of filter modules 117 via the separation interface 225. In particular, fluid including constituents of interest may flow from the set of filter modules 117. The fluid may be received at an external auxiliary element 237. The external auxiliary element 237 may process the fluid, particularly by performing diafiltration via a diafiltration buffer 238.

After processing, the external auxiliary element 237 may discharge the processed fluid to the set of filter modules 203 via an interface channel 239. In addition, the interface channel 239 may be used to discharge fluid to a self-contained filter unit 241.

The fluid outlet 121 of the filter system 105 is fluidly connected to the self-contained filter unit 241. The self-contained filter unit 241 may correspond to the self-contained filter unit 133. After being filtered by the self-contained filter unit 241, fluid containing constituents of interest may be discharged as product to the tank 129. In particular, the combination of the filter system 105, the external auxiliary elements 215 and 237 and the self-contained filter unit 241 may be used to produce a chemical, biological, or pharmaceutical product. The external auxiliary elements may enable a maximum amount of the product to be obtained per unit volume of fluid received by the platform 101. In particular, the product produced may be a biopharmaceutical product. The biopharmaceutical product may be stored in the tank 129.

The filter system 105 may also include a separation component 243. The separation component 243 may correspond to a separation component of a separation interface, e.g., the separation component 205b.

The separation interfaces 205, 219, 223, and 225 may each consist of two separation components, e.g., similar (or identical) to the separation components 109 and 243. Although each separation interface 205, 219, 223, and 225 is depicted as having four channels (e.g., two upstream inlets and two downstream outlets), it may be that a downstream separation component (e.g., the separation component 205a) of each separation interface 205, 219, 223, and 225 has only one outlet and an upstream separation component (e.g., the separation component 205b) of each separation interface 205, 219, 223, and 225 has only one inlet, as shown with respect to the separation components depicted in FIGS. 9 to 11.

Figure 3:
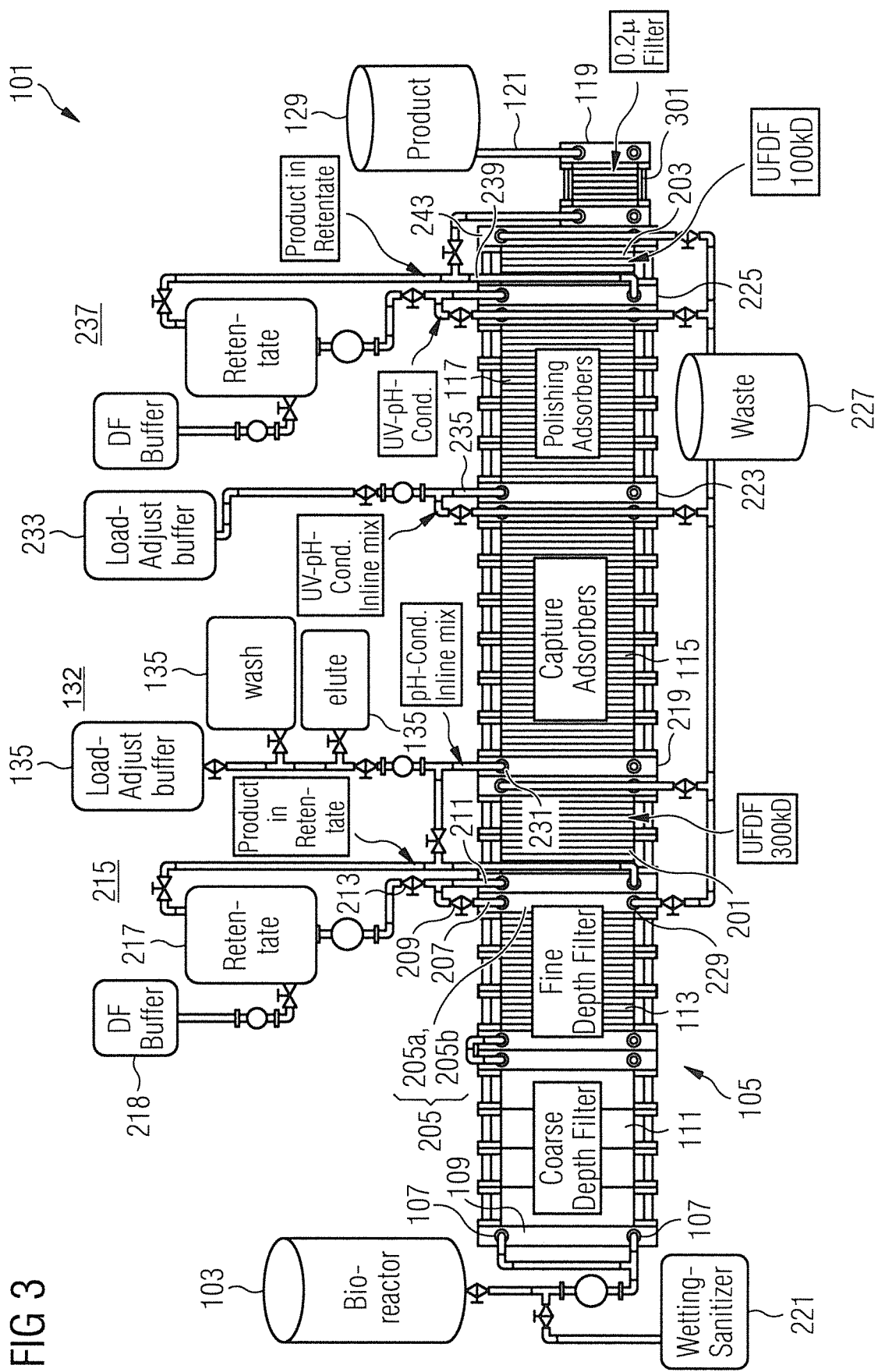
FIG. 3 shows another platform with a filter system similar to the filter system of FIG. 2.

FIG. 3 shows the platform 101 in a different configuration in comparison to the configurations of the platform 101 depicted in FIGS. 1 and 2. Similar to FIG. 2, FIG. 3 shows the separation interfaces 205, 219, 223, and 225, each of which may include two separation components, e.g., separation components 205a and 205b.

In contrast to FIG. 2, the filter system 105 of FIG. 3 includes a set of one or more filter modules 301 instead of the self-contained filter unit 241. The set of filter modules 301 may include membranes. The set of filter modules 301 may perform sterilizing filtration. In particular, a pore size (e.g., diameter) of 0.2 µm may be used.

Accordingly, the interface channel 239 of the separation interface 225 no longer includes a fluid outlet. Instead, the filter system 105 includes the second separation component 119. The second separation component 119 includes the fluid outlet 121.

Similar to FIG. 2, FIG. 3 shows that the filter system 105 may also include a separation component 243. The separation component 243 may correspond to a separation component of a separation interface, e.g., the separation component 205b.

Figure 4:
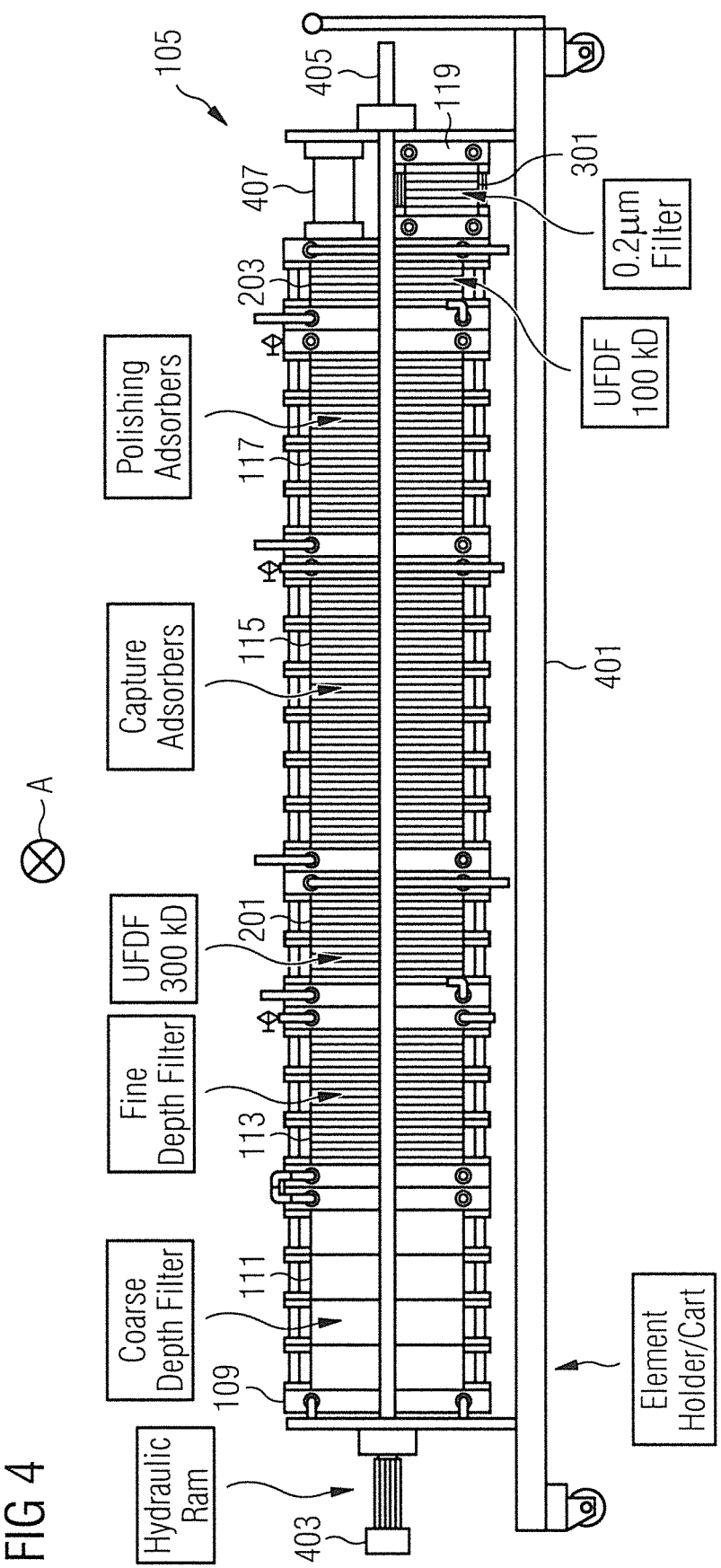
FIG. 4 shows the filter system of FIG. 3 on a filter system holder.

FIG. 4 shows a filter system holder 401. The filter system 105 is depicted on the filter system holder 401. As depicted in FIG. 4, the filter system 105 is suitable for producing a viral vaccine. The filter system holder 401 may include a first rod 403 and a second rod 405. The first rod 403 may be implemented as a hydraulic ram. The filter system 105 is in the configuration depicted in FIG. 3. Additional connections, e.g., to external auxiliary elements, the bioreactor 103, and the sanitizer tank 221, are not shown in the interest of visibility and clarity. In addition, a support 407 is included in order to compensate for a size difference between the set of filter modules 301 and the set of filter modules 203. The rods 403 and 405 may exert a pressing force on the separation components 109 and 119, as well as the support 407, in order to prevent displacement of the set of filter modules in a direction perpendicular to an arrangement direction A.

Figure 5:
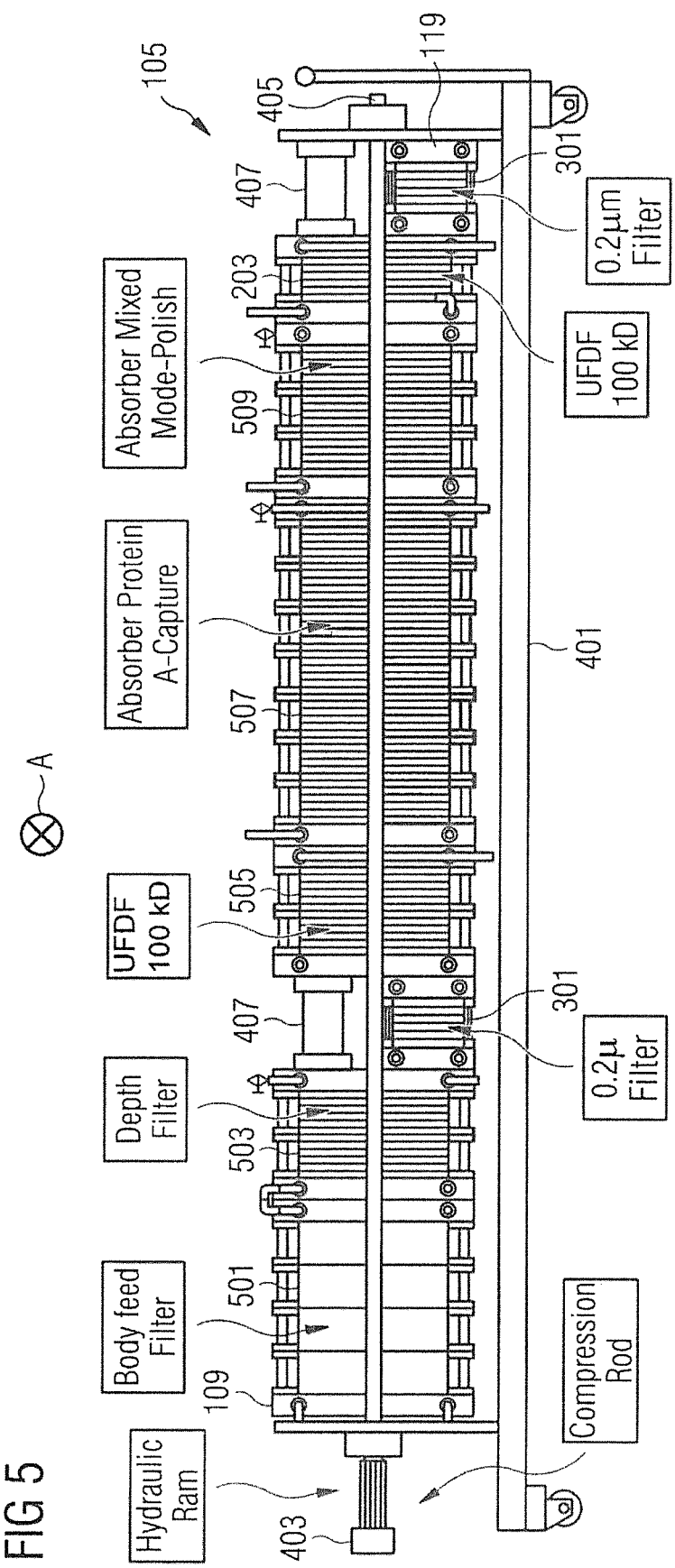
FIG. 5 shows the filter system of FIG. 3 after an exchange of multiple sets of filter modules.

The filter system depicted in FIG. 5 may include a combination of depth filters and membrane filters operable to adsorb substances via non-affinity chromatography may be suitable for producing a viral vaccine or virus-like particles (VLP) as a biopharmaceutical product. Producing VLP may include depth filtration for low density debris, bio-reduction/clarification plus pH conductivity adjustment, anion exchange (AEX) chromatography membrane filtration, cation exchange membrane filtration chromatography, tangential ultrafiltration/diafiltration, and sterile filtration.

FIG. 5 shows the filter system 105 after reconfiguration in order to produce a different product. In particular, the filter system 105 depicted in FIG. 5 may result after exchanging at least one of the sets of filter modules depicted in FIG. 4 with a corresponding set of filter modules. The corresponding set of filter modules differs from the modules in use in the filter system 105 having the configuration depicted in FIG. 4.

In particular, the set of filter modules 111 may be exchanged fora set of one or more filter modules 501. The set of filter modules 501 may include a body feed filter. The body feed filter may include diatomaceous earth. The body feed filter may be used for monoclonal antibody production and may provide coarse filtering to filter out larger particles and reduce the risk of clogging. In particular, the set of filter modules 501 may include relatively coarse filters (i.e. the filters may be more permeable) in comparison to the level of filtration provided by filters of the set of filter modules 111.

In addition, after the reconfiguration (including the exchange of sets of filter modules), the filter system 105 may include a set of one or more filter modules 503. In particular, the set of filter modules 113 may be exchanged for the set of filter modules 503 in order to arrive at the depicted configuration. Further, instead of the set of filter modules 201, the filter system 105 may include the set of filter modules 301. In particular, the filter system 105 may include two sets of filter modules 301 (i.e., the same set of filter modules at two different locations in the filter system 105).

The filter system 105 may further include a set of one or more filter modules 505. The set of filter modules 505 may include membranes and ultrafiltration filters. In particular, the set of filter modules 505 may have a nominal molecular weight cutoff of about 100 kD. Accordingly, the set of filter modules 505 may correspond to the set of filter modules 201 except that the set of filter modules 505 has a lower nominal molecular weight cutoff in comparison to the set of filter modules 201.

The filter system 105 may further include a set of one or more filter modules 507. The set of filter modules 507 may include membrane modules (e.g., membrane adsorbers). In particular, the membrane adsorbers of the set of filter modules 507 may be operable to adsorb via affinity chromatography, such as protein A capture. The filter system 105 may further include a set of one or more filter modules 509. The set of filter modules 509 may include membrane adsorber modules. In particular, the membrane adsorber modules of the set of filter modules 509 may be operable to adsorb via non-affinity chromatography. More particularly, the membrane adsorber modules of the set of filter modules 509 may be operable via ion exchange chromatography. Accordingly, the set of filter modules 509 may include filters containing ligands of multimodal functionality that adsorb protein via a combination of ionic interactions, hydrogen bonds and/or hydrophobic interactions. The filter system 105 may further include the set of filter modules 203.

Accordingly, a number of exchanges of sets of filter modules may be performed in order to arrive at the configuration of the filter system 105 depicted in FIG. 5 when starting from the configuration depicted in FIG. 4. In particular, the set of filter modules 111 may be exchanged for the set of filter modules 501. Similarly, the set of filter modules 113 may be exchanged for the set of filter modules 503. Further, the set of filter modules 201 may be exchanged for the set of filter modules 301 along with the spacer 407, to compensate for the difference in size (i.e., length in a direction perpendicular to the arrangement direction A) between the set of filter modules 301 and the sets of filter modules 503 and 505. Further, the set of filter modules 201 may be exchanged for the set of filter modules 505. In addition, the set of filter modules 115 may be exchanged for the set of filter modules 507. Moreover, the set of filter modules 117 may be exchanged for the set of filter modules 509. The set of filter modules 203 may remain in the filter system. Furthermore, the set of filter modules 301 depicted in FIG. 4 may remain in the filter system 105 of FIG. 5.

Thus, via an exchange of filter modules and possibly by connecting the new filter modules to different external auxiliary elements, the filter system 105 may be reconfigured to perform a different process and produce a different biological product. In particular, the filter system depicted in FIG. 5 may be suitable for producing monoclonal antibodies.

Figure 6:
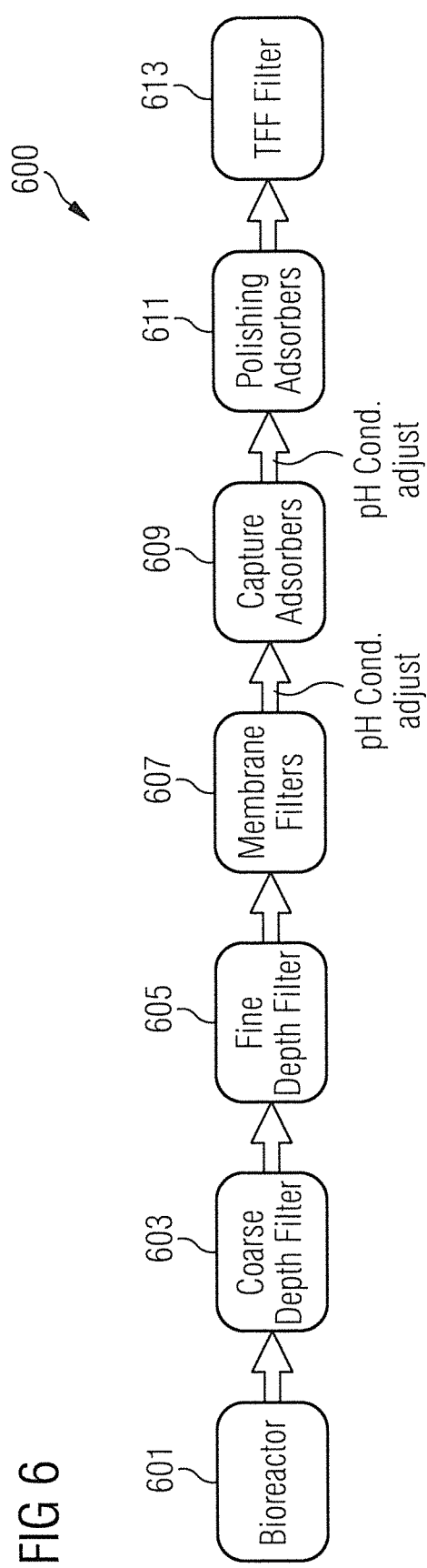
FIG. 6 shows the flow of fluid with respect to the platform of FIG. 1.

FIG. 6 shows a flow chart depicting the flow of fluid through the platform 101, as depicted in FIG. 1. In particular, fluid is processed in the bioreactor 103 at step 601. At step 603, the fluid may be received at the filter system 105 and may be processed in the set of filter modules 111. As discussed in connection with FIG. 1, the set of filter modules 111 may include depth filters. At step 605, the fluid may be received and processed through the set of filter modules 113. The set of filter modules 113 may also include depth filters. In comparison to the depths filters included in the set of filter modules 111, the set of filter modules 113 may include depth filters having a finer filtration grade.

At step 607, the fluid may be received at the self-contained filter unit 133. The self-contained filter unit 133 may include sterilizing grade microfilters. In particular, sterilizing grade filters may be membrane filters compliant with the ASTM F838 standard test method. At step 609, the fluid may be processed through the set of filter modules 115. Between the steps 607 and 609, the fluid may be adjusted using the filter support means 135.

At step 611, the fluid may be processed through the set of filter modules 117. Between the steps 609 and 611, the fluid may be adjusted using the filter support means 139. At step 613, the fluid may be processed through the set of filter modules 130.

Figure 7:
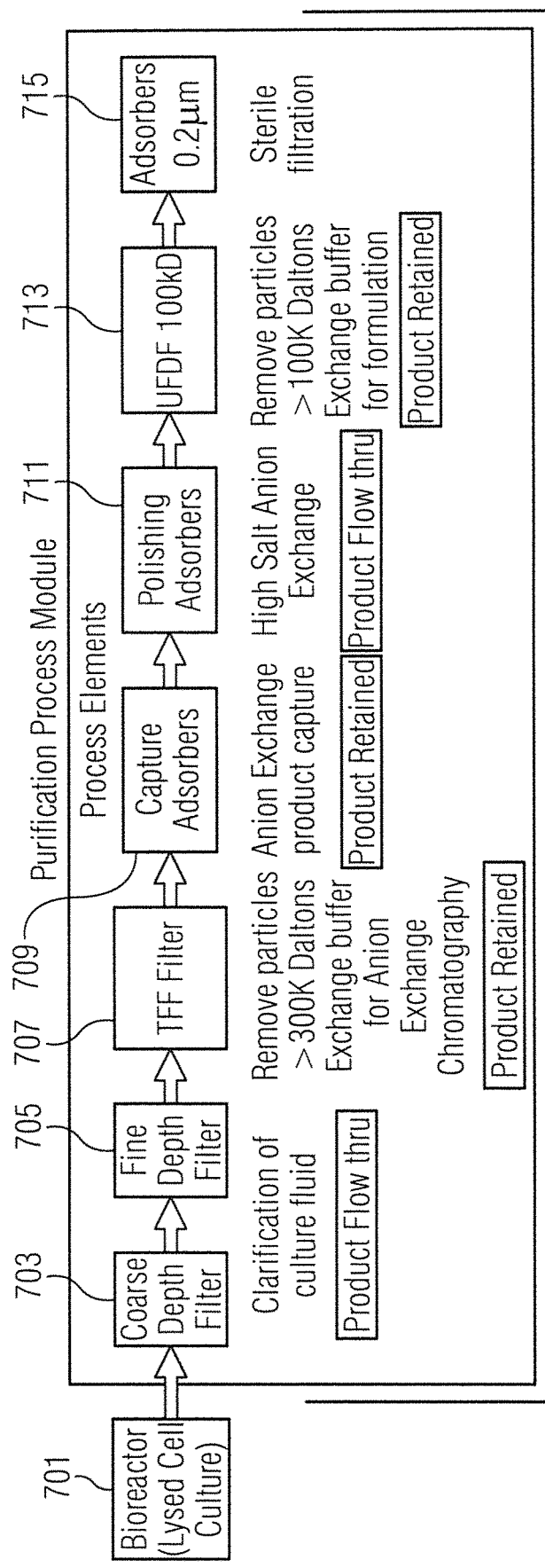
FIG. 7 shows a flow chart corresponding to the filter system of FIG. 4.

FIG. 7 shows process steps carried out by the platform 101 including the filter system 105 in the configuration depicted in FIGS. 2, 3, and 4.

At step 701, the bioreactor 103 produces a lysed cell culture. At step 703, the fluid from the bioreactor 103 is received by the filter system 105. Accordingly, the fluid flows through the fluid inlet 107 to the set of filter modules 111. Processing performed by the set of filter modules 111 may include clarification of culture fluid produced by the bioreactor 103. At step 705, the fluid flows to the set of filter modules 113. As described above, the set of filter modules 113 may include depth filters having a finer filtration grade in comparison to depth filters included in the set of filter modules 111.

At step 707, the fluid may flow to the set of filter modules 201. The set of filter modules 201 may remove particles from the fluid having a nominal molecular weight cutoff of greater than about 300 kD. In some cases, e.g., if retentate from the set of filter modules 201 is further processed, particles having a nominal molecular weight cutoff of less than about 300 kD (e.g., particles having a nominal molecular weight cutoff of between 200 kD and 300 kD) may be removed. Further, an external auxiliary element (e.g., the external auxiliary element 132) may include an exchange buffer for anion exchange chromatography.

At step 709, the fluid flows to the set of filter modules 115. The set of filter modules 115 may adsorb or gather constituents from the fluid as the fluid passes through. The fluid constituents adsorbed by the set of filter modules 115 may include constituents of interest, e.g., usable product. Accordingly, the fluid constituents adsorbed by the set of filter modules 115 may be received by the filter support means 233 and processed in order to extract fluid including usable product. The processed fluid, including the usable product, may be discharged to the set of filter modules 117. At step 711, the fluid flows to the set of filter modules 117.

At step 713, the fluid flows to the set of filter modules 203 for further processing.

At step 715, the fluid flows to the set of filter modules 301 or to self-contained filter unit 241 for further processing.

Figure 8:
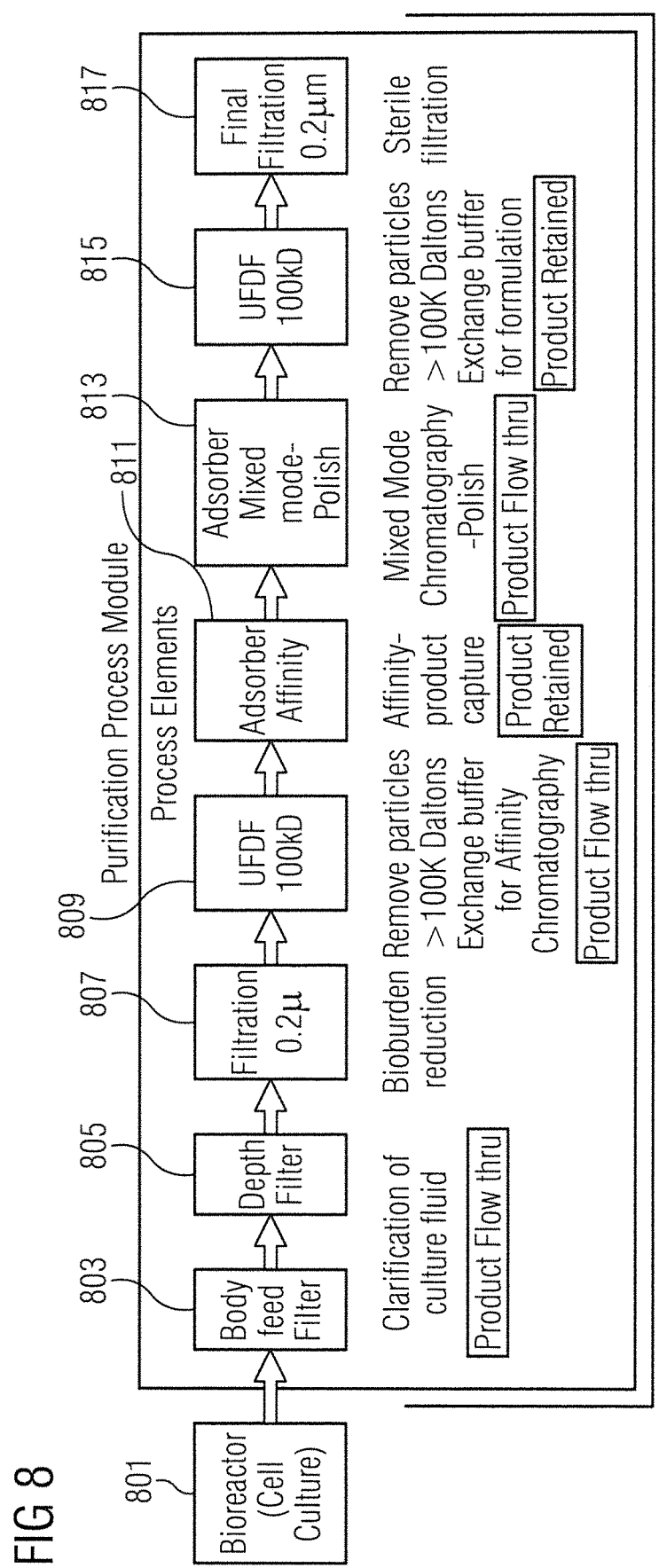
FIG. 8 shows a flow chart corresponding to the filter system of FIG. 5.

FIG. 8 shows a flow chart corresponding to the configuration of the filter system 105 depicted in FIG. 5. At step 801, a cell culture is received from the bioreactor 103. At step 803, the fluid from the bioreactor 103 is received via the fluid inlet 107 into the filter system 105. The fluid is then processed via the set of filter modules 501. Processing via the set of filter modules 501 may include clarification of the fluid. At step 805, the fluid may flow to the set of filter modules 503.

At step 807, the fluid may flow to the set of filter modules 301. The set of filter modules 301 may be used for bioburden reduction. Bioburden reduction may involve the removal of most, but not all bacteria. Removal of the bacteria may reduce potential fouling of sterilizing filters.

At step 809, the fluid may flow to the set of filter modules 505. The set of filter modules 505 may remove particles having a nominal molecular cutoff of greater than about 100 kD. In some cases, e.g., if retentate from the set of filter modules 505 is further processed, particles having a nominal molecular weight cutoff of less than about 100 kD (e.g., particles having a nominal molecular weight cutoff between 50 kD and 100 kD) may be removed. The set of filter modules 505 may serve as an exchange buffer for affinity chromatography performed by the set of filter modules 507 at step 811. After elution, the fluid may flow to the set of filter modules 509 at step 813. The set of filter modules 509 may be used for antibody polishing. The set of filter modules 509 may include mixed mode chromatography filters.

At step 815, the fluid may flow through the set of filter modules 203. The set of filter modules 203 may remove particles having a nominal molecular weight cutoff of greater than about 100 kD. In some cases, e.g., if retentate from the set of filter modules 203 is further processed, particles having a nominal molecular weight cutoff of less than about 100 kD (e.g., particles having a nominal molecular weight cutoff between 50 kD and 100 kD) may be removed. The set of filter modules 203 may act as an exchange buffer for formulation. At step 817, the set of filter modules 301 may be used to perform sterilization filtration.

Accordingly, the platform 101 can be arranged to process a variety of different types of molecules such as recombinant proteins, viral vaccines, monoclonal antibodies or antibody drug conjugates by arrangement of the filter modules in the filter system 105. Rearrangement of the filter modules in the filter system 105 may be a simple process of changing out and rearranging. External auxiliary elements may be arranged roughly a meter away from the filter system 105, within the same room or directly mounted on the filter system 105. Thus, the platform 101 provides great flexibility to shift between production of a variety of products with different chemistries without any physical movement of the platform itself. A shift from one product to another may involve merely exchanging sets of filter modules of the filter system 105, and coupling the sets of filter modules with corresponding external auxiliary elements using standard tubing connections and valves.

Figure 9:
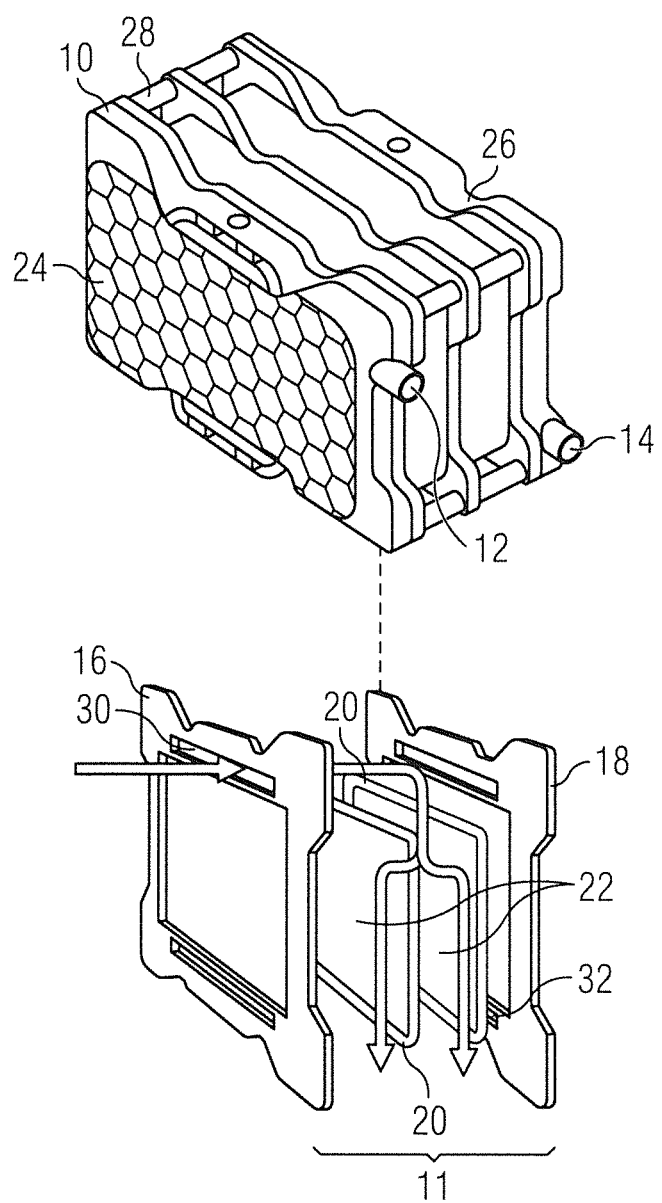
FIG. 9 shows a dead-end filter module and a filtering component of the dead-end filter module.

FIG. 9 shows a dead-end filter module 10. The dead-end filter module 10 may include a filter component 11 for filtering a fluid including constituents of interest. The fluid may flow into at least one module inflow channel 12 and out of at least one module outflow channel 14. Although only one module inflow channel 12 and one module outflow channel 14 are shown, there may be multiple module inflow channels 12 and module outflow channels 14 (e.g., two module inflow channels 12 and two module outflow channels 14, as shown in FIG. 1). The filter component 11 includes a first protecting part 16 and a second protecting part 18 for protecting filter elements 20. The filter element 20 includes filter media 22. Although multiple filter elements 20 and filter media 22 are shown, only one filter element 20 and one filter medium 22 might be used.

Although only one filter component 11 is shown, multiple filter components 11 may be included in the filter module 10. The filter module 10 includes an upstream separation component 24, a downstream separation component 26 and a handle 28. The separation components 24 and 26 may correspond to separation components described above. For example, the upstream separation component 24 may correspond to the separation component 109 and the downstream separation component 26 may correspond to the separation component 119. Further, multiple filter modules may be arranged between two separation components, as discussed in connection with FIG. 1.

Accordingly, the fluid may flow from an upstream direction, toward the filter module 10, into the module inflow channel 12, and through the filter media 22 via the filtering component inlet 30. Passage through the filter media 22 may be referred to as processing of the fluid. Particles may be separated from the fluid during passage through the filter media 22. After, passing through the filter media 22, the processed fluid may flow out of the module outflow channel 14 via a downstream filtering component outlet 32. From the module outflow channel 14, the fluid may flow to further filter modules.

In order to assemble the filter module 10, the first protecting part 16, the filter element 20, and the second protecting part 18 may be fastened to one another in the arrangement position and then fastened together to form the filter module. The fastening may be achieved by latching, locking, screwing, welding, or adhesive bonding.

The filtering component inlet 30 may be fluidly connected to a retentate chamber (not shown) for holding collected retentate from the fluid. The depth of the retentate chamber may be selected depending on the expected volume of accumulating retentate. For example, the retentate chamber may have a depth of approx. 5 mm, approx. 10 mm, or approx. 20 mm. If the filter module 10 is designed to filter a fluid with a relatively large amount of substances to be retained (e.g., contaminants), the depth of the retentate chamber may also be approx. 50 mm, approx. 100 mm, approx. 200 mm, or more. Accordingly, the volume of the retentate chamber may be approx. 10 ml, approx. 100 ml, approx. 1 liter, approx. 5 liters, or more than 5 liters.

The filter media 22 may be semi-permeable, such that filter media specific substances (e.g., contaminants or particles above a specified size) cannot pass through the filter media 22. Since fluid flow is from an upstream retentate side to a downstream filtrate side of the filter media 22, the filter media specific substances remain on the retentate side, and do not pass to the filtrate side of the filter media 22. There may be a fluid pressure difference between the retentate side and the filtrate side, depending on applied fluid pressure and the permeability of the filter media 22.

The filter medium 22 may be held in place by way of a filter medium holder (not shown) of the filter element 20. The filter medium holder may help ensure that the filter medium 22 is held in its position and in its shape.

In some cases, a depth filter may be used as the filter media 22. The filter media 22 within a single module 10 may all have the same pore size. Similarly, the filter media 22 within a single set of filter modules may have the same pore size. Different sets of filter modules (e.g., the set of filter modules 111 and the set of filter modules 113) may include filter media 22 having different pore sizes.

The filter element 20 may comprise a plurality of identical or different filter media 22. A plurality of layers of a depth filter can also be combined as a filter medium 22. Different filter media may be combined in one filter element 20.

In the arrangement position, the filter element 20 may be arranged with the filter medium 22 between the first protecting part 16 and the second protecting part 18. The filter element 20 may be protected via the protecting parts against external mechanical and chemical influences. In particular, the protecting parts 16 and 18 may prevent contact with the filter media 22 by hand.

The arrangement position may be understood as a position in which a filter system (e.g., the filter system 105) is in operation. With reference to FIG. 1, the fluid inlet 107 may be fluidly connected to a first set of filter modules 113 and the fluid outlet 121 may be fluidly connected to a second set of filter modules 115 in the arrangement position. In this example, there are intervening sets of filter modules between the fluid inlet 107 and the first set of filter modules 113, and intervening sets of filter modules between the second set of filter modules 115 and the fluid outlet 121. However, examples in which there are no intervening sets of filter modules are also possible.

Continuing the example, the second interface channel 127 may be fluidly connected to the module inflow channel 12 of the second set of filter modules 115 in the arrangement position. Similarly, the first interface channel 125 may be fluidly connected to the module outflow channel 14 of the first set of filter modules 113 in the arrangement position.

Figure 10A:
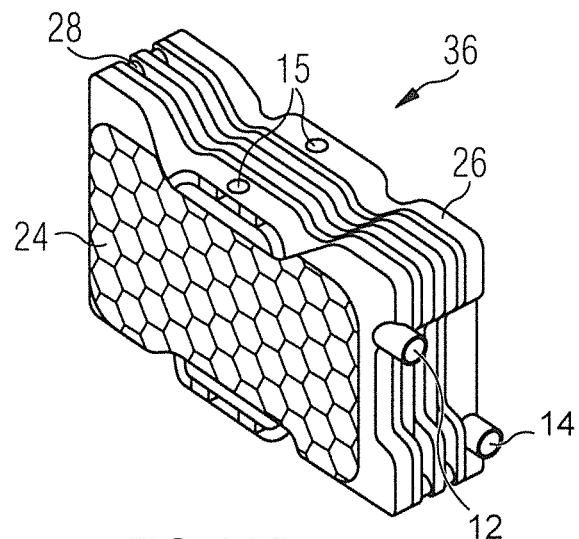
FIG. 10*a* shows a TFF filter module.

FIG. 10A shows a TFF filter module 36. Unless otherwise indicated, components of the TFF filter module 36 are identical to the components of the dead-end filter module 10. In particular, in some cases the TFF filter module 36 has the same external dimensions and materials of construction as the dead-end filter module 10. However, internal construction and flow pathways of the TFF filter module 36 differ from the internal construction and flow pathways of the dead-end filter module 10.

In other cases, the TFF filter module 36 has different dimensions than the dead-end filter module 10. In such cases, the TFF filter module 36 may be fitted into a filter system (e.g., the filter system 105) using spacers.

The TFF filter module 36 includes at least one module inflow channel 12 and at least one module outflow channel 14. The TFF filter module 36 further includes at least one module permeate outflow channel 15 (two permeate outflow channels are shown in FIG. 10A). Further, the inflow channel 12 and the outflow channel 14 may be provided on the same separation component, e.g., as shown in FIG. 2 for the set of filter modules 201.

Similar to the dead-end filter module 10, the TFF filter module 36 includes at least one filtering component 11. Further, the filter component 11 includes the first and second protecting parts 16 and 18, and the filter element 20.

Figure 10B:
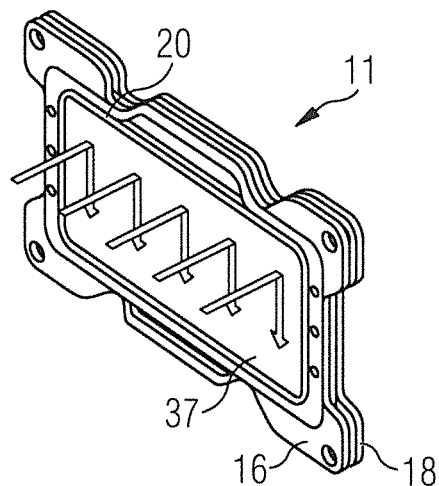
FIG. 10*b* shows a filtering component of the TFF filter module.

FIG. 10B shows a filter component 11 of the TFF filter module 36 from an upstream perspective. In particular, fluid may flow toward a visible side of a filter medium 37. In contrast to the dead-end filter module 10, the first protecting part 16 of the TFF filter module 36 may include an upstream filtering component outlet (not shown).

Accordingly, rather than allowing fluid containing constituents of interest to flow out of the module outflow channel (as in the case of the dead-end filter module 10), fluid containing constituents of interest may flow across the filter medium 37 and out the upstream filtering component outlet. The fluid may be recirculated across the filter medium 37 for further purification (e.g., diafiltration), possibly via an external auxiliary element (e.g., the external auxiliary element 215). The filter medium 37 may be a surface filter rather than the depth filter medium discussed with respect to FIG. 9.

Alternatively (depending on the porosity of the filter medium 37), fluid containing constituents of interest may pass through the filter medium 37 (as permeate) and flow further in the filter system 105 for further processing (e.g., purification via conditioning and further filtration), while undesired substances (e.g., contaminants) may be separated from the fluid and discharged as waste.

Figure 10C:
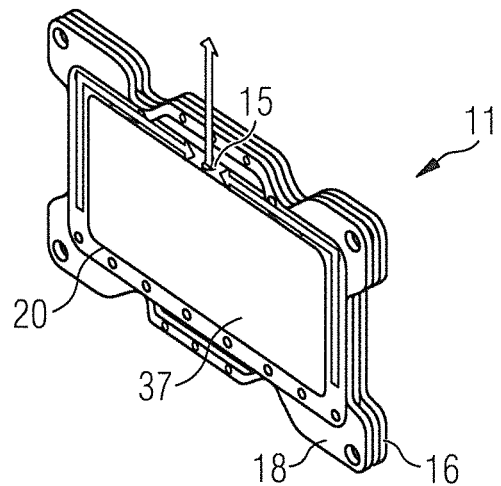
FIG. 10*c* also shows the filtering component of the TFF filter module.

FIG. 10C also shows the filtering component 11 of the TFF filter module 36 from a downstream perspective. In particular, fluid may flow from the side of the filter medium 37 that is not visible. The flow of the fluid may be tangential to the filter medium 37. Permeate may flow out of the TFF filter module 36 via the module permeate outflow channel 15. As discussed above, the permeate may contain constituents of interest, which may be extracted via further processing.

Figure 11:
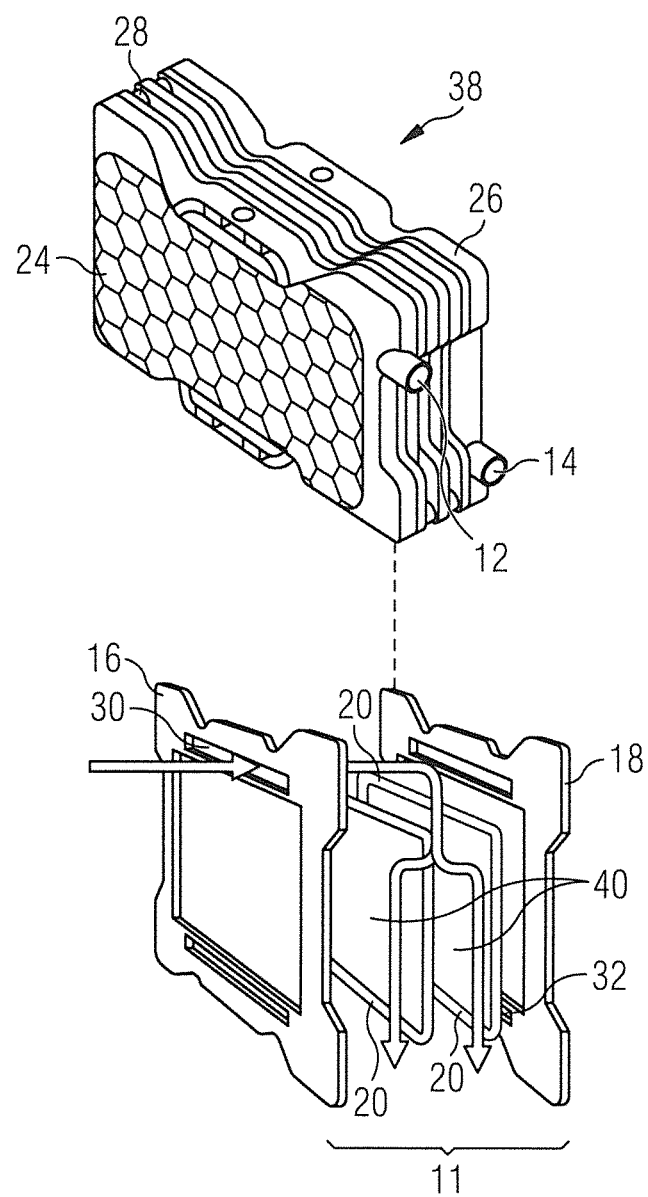
FIG. 11 shows a membrane adsorber module.

FIG. 11 shows a membrane adsorber module 38. Unless otherwise indicated, components of the membrane adsorber module 38 are identical to the components of the dead-end filter module 10.

In particular, in some cases the membrane adsorber module 38 has the same external dimensions and materials of construction as the dead-end filter module 10. However, internal construction and flow pathways of the membrane adsorber module 38 differ from the internal construction and flow pathways of the dead-end filter module 10.

In other cases, the membrane adsorber module 38 has different dimensions than the dead-end filter module 10. In such cases, the membrane adsorber module 38 may be fitted into a filter system (e.g., the filter system 105) using spacers.

In contrast to the dead-end filter module 10, the membrane adsorber module may include filter media 40. Fluid may pass through or be adsorbed depending on the characteristics of the filter media 40.

Similar to the dead-end filter module 10, fluid containing constituents of interest may pass through the filter media 40, while undesired substances (e.g., impurities or contaminants) may be adsorbed by the filter.

Alternatively, (e.g., when different filter media are used), the constituents of interest may be adsorbed by the filter media 40, while the fluid containing undesired substances passes through the filter media 40. In this case, the constituents of interest may be removed (e.g., eluted) from the filter media 40 and may be directed further to an external auxiliary element (e.g., the external auxiliary element 128) for further processing.

LIST OF REFERENCE NUMERALS

Dead-end filter module 10
Filter component 11
Module inflow channel 12
Module outflow channel 14
Module permeate outflow channel 15
First protecting part 16
Second protecting part 18
Filter element 20
Filter medium 22, 37, 40
Upstream separation component 24
Downstream separation component 26
Handle 28
Filtering component inlet 30
Downstream filtering component outlet 32
TFF filter module 36
Membrane adsorber module 38
platform 101
bioreactor 103
filter system 105,106
fluid inlet 107
separation component 109,119, 205a, 205b
set of filter modules 111,113,115,117,130, 201,203,301, 501, 503,505,507,509
fluid outlet 121
separation interface 123,141,205,219,223,225
first interface channel 125,143,207
second interface channel 127,145,211,231,235
tank 129,131,217
external auxiliary element 128,132,137,215,237
self-contained filter unit 133,241
filter support means 135,139,233
valve 136,140,144,146,209,213
sanitizer tank 221
waste tank 227 interface channel 229,239
diafiltration buffer 218, 238
filter system holder 401
first rod 403
second rod 405
support 407
arrangement direction A

What is claimed is:

1. A filtration assembly, comprising:
    at least first and second filter systems, each of the filter systems comprising:
        an upstream separation component having an upstream fluid inlet and an upstream fluid outlet,
        one or more filter modules having a module inflow channel communicating with the fluid outlet of the upstream separation component and a module outflow channel, and
        a downstream separation component having a downstream fluid inlet communicating with the module outflow channel and a downstream fluid outlet, wherein;
            the upstream fluid inlet of the upstream separation component of the first filter system communicates with an inlet to the filtration assembly;
            the downstream fluid outlet of the first filter system communicates with the upstream fluid inlet of the second filter system;
            the one or more filter modules of the first filter system differ from the one or more filter modules of the second filter system; and the separation components separate the filter modules of the respective filter system from components of the filtration assembly upstream and downstream of the respective filter system; and
            at least one of the separation components selectively closes the module inflow channel and/or the module outflow channel thereof, thereby preventing fluid that has not been filtered from passing directly to an adjacent one of the filter systems.

2. The filtration assembly of claim 1, further comprising at least one auxiliary element, the auxiliary element to:
    receive fluid from the downstream fluid outlet of the downstream separation component of the first filter system;
    process the fluid; and
    discharge the fluid processed by the auxiliary element to the upstream fluid inlet of the upstream separation component of the second filter system.

3. The filtration assembly of claim 2, further comprising at least one valve between the downstream separation component of the first filter system and the upstream separation component of the second filter system.

4. The filtration assembly of claim 2, wherein the fluid received by the auxiliary element via the downstream fluid outlet of the downstream separation component of the first filter system is retentate and/or filtrate from the first filter system,
    wherein the processed fluid discharged to the second filter system includes constituents of interest from the first filter system.

5. The filtration assembly of claim 1, wherein at least one of the first and second filter systems is further to:
    receive a sanitizer
    via a sanitizer inlet and to discharge sanitizer waste via a sanitizer outlet downstream of the sanitizer inlet, wherein the sanitizer is an aqueous, alkaline, or acidic based solution that reduces bioburden.

6. The filtration assembly of claim 2, wherein the auxiliary element is to process the fluid by separating out at least one constituent of the received fluid, wherein the separation may be performed via chromatography, diafiltration, tangential flow filtration, or dialysis.

7. The filtration assembly of claim 2, wherein the auxiliary element is to process the fluid by adjusting the pH of the fluid.

8. The filtration assembly of claim 7, wherein the auxiliary element is to adjust the pH of the fluid by adding a stabilizing buffer to the fluid, wherein the buffer may be a biological buffer, wherein the buffer may comprise an acid and a conjugated base, wherein the buffer may be a Good buffer, wherein the buffer may be zwitterionic.

9. The filtration assembly of claim 2, wherein the auxiliary element comprises a self-contained filter unit, wherein the self-contained filter unit may include at least one capsule.

10. The filtration assembly of claim 2, further comprising a third filter system, wherein the downstream fluid outlet of the second filter system communicates with the upstream fluid inlet of the third filter system; and
    wherein the at least one auxiliary element includes a first auxiliary element and a second auxiliary element.

11. The filtration assembly of claim 10,
    wherein the fluid received and processed by the first auxiliary element is retentate; and
    wherein the fluid discharged to the second filter system via the first auxiliary element includes constituents of interest derived from the retentate.

12. The filtration assembly of claim 10,
    wherein the second external auxiliary element is to:
        receive processed fluid including constituents of interest from the first auxiliary element or from the second filter system;
        adjust the pH of the received fluid;
        discharge the adjusted and processed fluid to the third filter system.

13. The filtration assembly of claim 1, wherein at least one of the filter modules of the first filter system includes a first depth filter;
    wherein at least one of the filter modules in the second filter system may include a second depth filter having a finer filtration grade than the first depth filter.

14. The filtration assembly of claim 1, wherein at least one of the filter modules of the first and second filter systems includes a membrane selected from the group consisting of:
    an adsorber and/or antibody polisher;
    a sterilizing grade filter;
    a microfiltration filter and/or a nano-filter;
    an ultrafiltration and/or diafiltration filter;
    a membrane that is operable to adsorb via affinity chromatography;
    a membrane that is operable to adsorb via non-affinity chromatography;
    a membrane that includes a quaternary amine ligand; and
    a membrane that includes a polyallylamine ligand.

15. The filtration assembly of claim 1, wherein the filter modules in the first filter system are identical to each other, and
    wherein the filter modules in the second filter system are identical to each other.

16. The filtration assembly of claim 1, wherein at least one of the filter modules is configured for chemical interaction and/or adsorption.

17. A filtration assembly, comprising:
 at least first and second filter systems, with each of the filter systems comprising:
  a first set of one or more filter modules and a second set of one or more filter modules,
   wherein the first set of filter modules differs from the second set of filter modules;
   wherein each set of filter modules includes a module inflow channel and a module outflow channel;
  a fluid inlet to be fluidly connected to the first set of filter modules;
  a fluid outlet to be fluidly connected to the second set of filter modules; and
  a separation interface separating the first set of filter modules from the second set of filter modules, the separation interface comprising:
   a first interface channel to be fluidly connected to the module outflow channel of the first set of filter modules,
   a second interface channel to be fluidly connected to the module inflow channel of the second set of filter modules, and
   at least one separation component that selectively closes the module inflow channel of the second set of filter modules and/or the module outflow channel of the first set of filter modules, thereby selectively preventing fluid that has not been filtered from passing directly to the first set of filter modules or the second set of filter modules;
 the filter system to:
  receive fluid through the fluid inlet, and after the fluid has passed through each set of filter modules, discharge the fluid through the fluid outlet, wherein each filter module includes a first protecting part, a second protecting part, and a filter element.

18. A filtration assembly, comprising:
 at least one filter system, comprising:
  a first set of one or more filter modules and a second set of one or more filter modules,
   wherein the first set of filter modules differs from the second set of filter modules;
   wherein each set of filter modules includes a module inflow channel and a module outflow channel;
  a fluid inlet to be fluidly connected to the first set of filter modules;
  a fluid outlet to be fluidly connected to the second set of filter modules; and
  a separation interface separating the first set of filter modules from the second set of filter modules, the separation interface comprising:
   a first interface channel to be fluidly connected to the module outflow channel of the first set of filter modules, and
   a second interface channel to be fluidly connected to the module inflow channel of the second set of filter modules;
 the filter system to:
  receive fluid through the fluid inlet, and
 after the fluid has passed through each set of filter modules, discharge the fluid through the fluid outlet,
  wherein at least one of the filter modules in the first filter system and the second filter system includes:
  a body feed filter medium;
  a bioburden control filter medium.

* * * * *